US010469328B2

(12) United States Patent
Chung et al.

(10) Patent No.: US 10,469,328 B2
(45) Date of Patent: *Nov. 5, 2019

(54) OPPORTUNISTIC FORWARDING METHOD OF USING DELAY TOLERANT NETWORK FOR CONTENT-BASED INFORMATION CENTRIC NETWORK AND APPARATUS FOR PERFORMING THE METHOD

(71) Applicant: Foundation of Soongsil University-Industry Cooperation, Seoul (KR)

(72) Inventors: Yun Won Chung, Seoul (KR); Younghan Kim, Seoul (KR); Min Wook Kang, Namyangju-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 53 days.

This patent is subject to a terminal disclaimer.

(21) Appl. No.: 15/895,860

(22) Filed: Feb. 13, 2018

(65) Prior Publication Data

US 2019/0149427 A1 May 16, 2019

(30) Foreign Application Priority Data

Nov. 14, 2017 (KR) .................. 10-2017-0151494
Dec. 5, 2017 (KR) .................. 10-2017-0165956

(51) Int. Cl.
*H04W 40/00* (2009.01)
*H04L 12/24* (2006.01)
(Continued)

(52) U.S. Cl.
CPC ............ *H04L 41/147* (2013.01); *H04L 45/02* (2013.01); *H04L 45/302* (2013.01); *H04L 45/44* (2013.01);
(Continued)

(58) Field of Classification Search
None
See application file for complete search history.

(56) References Cited

U.S. PATENT DOCUMENTS

2011/0090908 A1* 4/2011 Jacobson ............. H04L 45/745
  370/392
2011/0149858 A1* 6/2011 Hwang ................ H04W 40/26
  370/328

(Continued)

FOREIGN PATENT DOCUMENTS

EP        2942926 A1     11/2015
KR   10-2015-0030531 A   3/2015
KR      10-1746658 B1    6/2017

OTHER PUBLICATIONS

Prior Disclosure by inventor which does not qualify as prior art under 35 USC 102(b)(1): Y.W. Chung, M. W. Kang, and Y. Kim, "Extension of Probabilistic Routing Protocol using History of Encounters and Transitivity for Information Centric Network", Internet Draft. Nov. 15, 2017, p. 1-8, Soongsil University, Seoul, Republic of Korea.

(Continued)

*Primary Examiner* — Sithu Ko
(74) *Attorney, Agent, or Firm* — Novick, Kim & Lee, PLLC; Sang Ho Lee

(57) ABSTRACT

Provided is an opportunistic forwarding method and apparatus for a content-based information centric network in a delay tolerant network environment. The opportunistic forwarding method for a content-based information centric network in a delay tolerant network environment having a processor and a memory includes when a first node contacts a second node, updating a first delivery predictability and a second delivery predictability of the first node based on contact record information between the first node and the second node and data that the second node has, updating a (Continued)

first message of the first node by comparing the first message including first interest information and first data that the first node has with a second message including second interest information and second data that the second node has, and delivering the first message of the first node to the second node based on the first and second delivery predictabilities of the first node.

11 Claims, 17 Drawing Sheets

(51) Int. Cl.

| | | |
|---|---|---|
| *H04L 12/721* | (2013.01) | |
| *H04L 12/725* | (2013.01) | |
| *H04L 12/751* | (2013.01) | |
| *H04L 29/12* | (2006.01) | |
| *G06F 16/951* | (2019.01) | |

(52) U.S. Cl.
CPC ...... *H04L 61/1582* (2013.01); *H04L 61/3015* (2013.01); *G06F 16/951* (2019.01)

(56) References Cited

U.S. PATENT DOCUMENTS

| | | | | |
|---|---|---|---|---|
| 2013/0219081 A1* | 8/2013 | Qian | ..................... | H04L 67/327 709/241 |
| 2013/0282860 A1* | 10/2013 | Zhang | ................... | H04L 45/306 709/217 |
| 2015/0281083 A1* | 10/2015 | Kim | ..................... | H04L 45/7457 370/235 |
| 2016/0020990 A1* | 1/2016 | Mahadevan | .......... | H04L 45/026 709/204 |
| 2016/0182353 A1* | 6/2016 | Garcia-Luna-Aceves | ................... | H04L 45/306 709/241 |
| 2016/0192192 A1* | 6/2016 | Seedorf | ................. | H04L 9/3265 713/176 |
| 2017/0264536 A1* | 9/2017 | Wood | ...................... | H04L 45/54 |
| 2018/0018713 A1* | 1/2018 | Burleigh | ............ | G06Q 30/0277 |
| 2018/0069791 A1* | 3/2018 | Dong | ..................... | H04L 45/54 |
| 2019/0073419 A1* | 3/2019 | Dong | ..................... | H04L 67/00 |

OTHER PUBLICATIONS

Prior Disclosure by inventor which does not qualify as prior art under 35 USC 102(b)(1): Min Wook Kang, Younghan Kim, and Yun Won Chung, "An Opportunistic Forwarding Scheme for ICN in Disaster Situations", journal, Soongsil University School of Electronic Engineering, Seoul, South Korea. Oct. 18, 2017.

Prior Disclosure by inventor which does not qualify as prior art under 35 USC 102(b)(1): Min Wook Kang, Younghan Kim, and Yun Won Chung, "An Opportunistic Data Forwarding Scheme in Content-based Information Centric Network", Journal of 2017 Fall Conference, Soongsil University School of Electronic Engineering and Department of Information and Telecommunications Engineering, Seoul, South Korea. Dec. 1, 2017.

\* cited by examiner

| Delivery Strategy | Comparing the Delivery Predictability | Decision |
|---|---|---|
| OR | P(A,R1)>P(B,R1) or P(B,R2)>P(A,R2) | Forward the C1 |
| AND | P(A,R1)>P(B,R1) and P(B,R2)>P(A,R2) | -- |
| AVG | AVG(P(A,R1)+P(A,R1)) > AVG(P(B,R2)+P(B,R2)) | -- |

OPPORTUNISTIC FORWARDING METHOD OF USING DELAY TOLERANT NETWORK FOR CONTENT-BASED INFORMATION CENTRIC NETWORK AND APPARATUS FOR PERFORMING THE METHOD

CROSS-REFERENCE TO RELATED APPLICATIONS

This application claims priority under 35 U.S.C. § 119 to Korean Patent Application No. 10-2017-0151494, filed on Nov. 14, 2017 and Korean Patent Application No. 10-2017-0165956, filed on Dec. 5, 2017, in the Korean Intellectual Property Office, the disclosures of which are incorporated herein by reference in its entirety.

TECHNICAL FIELD

The present disclosure relates to an opportunistic forwarding method and apparatus for a content-based information centric network in a delay tolerant network environment, and more particularly, to a method and apparatus for opportunistically forwarding messages of interest information and data for a content-based information centric network in a delay tolerant network environment where connectivity between nodes is not guaranteed.

BACKGROUND

Information Centric Network (ICN) is technology proposed to overcome a traffic congestion phenomenon which is a disadvantage of the conventional IP address-based communication scheme. The Internet usage is now increasing rapidly in terms of the number of users and data capacity. According to the existing IP address-based data transmission scheme, transmission is performed using the IP address of the receiver related to the physical location, which is inefficient because the same data is repeatedly transmitted on the network as many times as the number of service requests.

ICN is a communication approach based on the data name rather than an IP address, in which routers or nodes store specific data and distribute data to neighbor routers or nodes that request the corresponding data. In ICN, a message may be classified into interest information and data. A consumer or a data requester that needs data may disseminate interest information via the network. When receiving the interest information, a router, node or data provider possessing the requested data through the interest information may deliver the data to the consumer or the data requester through a reverse path used to deliver the interest information.

Specifically, in ICN, interest information and data may be delivered using Content Store (CS), Pending Interest Information Table (PIT) and Forwarding Information Base (FIB). CS may be a storage device such as buffers of routers and nodes, and may be used to store data and data name lists. PIT may be used to store input/output records of interest information. The input/output records may include incoming and outgoing faces. When routers and nodes receive interest information, the routers may transmit the interest information to a probable node and store input/output records of the interest information in PIT. When receiving data corresponding to interest information, routers and nodes may check PIT, transmit the data via the incoming face to which the interest information is inputted, and delete the corresponding interest information. FIB may be responsible for delivery of interest information and delivery control.

Looking at the communication scheme in ICN, when interest information is received at routers and nodes, a determination may be made as to whether the data name stored in CS of the routers and the nodes matches the name of the interest information. When the name stored in CS of the routers and the nodes matches the name of the interest information, the corresponding data is present in CS, and thus the routers and the nodes may check PIT and transmit the corresponding data via a reverse path through which the interest information is delivered, and delete the interest information.

Additionally, when the name of the received interest information is present in PIT, the incoming face of the corresponding interest information may be added to PIT. That is, it is regarded that a new consumer or data requester of the corresponding interest information is added. Here, the new consumer or data requester may be identified by a random variable stored in the interest information.

Additionally, when the name of the received interest information is present in FIB, the name of the corresponding interest information and the incoming face may be added to PIT, the corresponding interest information may be transmitted to other routers or nodes, and the outgoing face may be stored. On the contrary, when the name of the received interest information is absent in FIB, a service for the corresponding data is impossible, and thus the corresponding interest information may be deleted.

Meanwhile, when data is received at routers and nodes, a determination may be made as to whether the received data is stored in CS by identifying the data name stored in CS of the routers and the nodes. When the name of the received data is present in CS of the routers and the nodes, the received data may be deleted.

Additionally, when the name of the received data is present in PIT, the received data is the requested data, and thus the received data may be stored in CS, and the corresponding data may be transmitted to the incoming face of the interest information. On the contrary, when the name of the received data is absent in PIT, the received data is not the requested data, and thus the received data may be deleted.

In ICN, each node may transmit an interest information message to request data. Thus, a source node having received the interest information may deliver the data using a reverse path through which the interest information is delivered. Accordingly, ICN can be only applied in a network environment in which the connectivity between nodes is guaranteed, and it is difficult for ICN itself to be applied to a delay tolerant network environment in which connectivity between nodes is not guaranteed.

SUMMARY

An aspect of the present disclosure provides an opportunistic forwarding method in which upon contact with other node, two types of delivery predictabilities are updated based on contact record information with other node and data that other node has, and a message of interest information or data is delivered to other node, reflecting the two types of delivery predictabilities and information added to the interest information or data.

Another aspect of the present disclosure provides an opportunistic forwarding apparatus that upon contact with other node, updates two types of delivery predictabilities based on contact record information with other node and data that other node has, and delivers a message of interest information or data to other node, reflecting the two types of delivery predictabilities and information added to the interest information or data.

According to one embodiment of the present disclosure, an opportunistic forwarding method for a content-based information centric network in a delay tolerant network environment having a processor and a memory is provided. The opportunistic forwarding includes when a first node contacts a second node, updating a first delivery predictability and a second delivery predictability of the first node based on contact record information between the first node and the second node and data that the second node has, updating a first message of the first node by comparing the first message including first interest information and first data that the first node has with a second message including second interest information and second data that the second node has, and delivering the first message of the first node to the second node based on the first and second delivery predictabilities of the first node.

The updating of the first and second delivery predictabilities of the first node may include updating the first delivery predictability between arbitrary nodes including the first node and the second node based on the contact record information between the first node and the second node, and when is the second data that the second node has include data corresponding to the first interest information that the first node has, updating the second delivery predictability between the first node and any node that has data corresponding to the first interest information that the first node has.

The step of the updating of a first message of the first node may include when the first interest information includes corresponding interest information to any of the second interest information, updating request node information of the corresponding interest information, and when the first data include corresponding data to any of the second data, updating destination node information of the corresponding data.

Alternatively, the step of the delivering of the first message of the first node to the second node may include delivering the first interest information that the first node has to the second node based on a result of a comparison between the first delivery predictability and the second delivery predictability, wherein the first delivery predictability is a delivery predictability between the first node and node that has data corresponding to the first interest information that the first node has and the second delivery predictability is a delivery predictability between the second node and node that has data corresponding to the first interest information that the first node has.

The opportunistic forwarding method for the content-based information centric network in the delay tolerant network environment may further include reflecting a value of priority assigned to the first interest information that the first node has to the second delivery predictability between the second node and node that has data corresponding to the first interest information that the first node has.

The step of the delivering the first interest information that the first node has to the second node based on a result of a comparison between the first delivery predictability and the second delivery predictability may further include determining whether a request node of the first interest information that the first node has is the first node based on the result of the comparison, and when the request node of the first interest information that the first node has is determined to be the first node, delivering the first interest information that the first node has to the second node based on a retransmission time set when the first interest information that the first node has are generated.

The step of the delivering the first message of the first node to the second node may include delivering the first data that the first node has to the second node based on a result of a comparison between the first delivery predictability and the second delivery predictability, wherein the first delivery predictability is a delivery predictability between the first node and at least one destination node of the first data that the first node has and the second delivery predictability is a delivery predictability between the second node and the at least one destination node of the first data that the first node has.

The step of the delivering the first data that the first node has to the second node based on a result of the comparison may include when the result of the comparison of a delivery predictability of any one of the at least one destination node of the first data that the first node has satisfies a predefined condition, delivering the first data that the first node has to the second node, or when the result of the comparison of a delivery predictability of all of the at least one destination node of the first data that the first node has satisfies a predefined condition, delivering first data that the first node has to the second node.

The step of the delivering the first data that the first node has to the second node based on a result of the comparison may include delivering the first data that the first node has to the second node based on the result of the comparison of average of delivery predictabilities among the first node and each of the at least one destination node of the first data that the first node has with average of delivery predictabilities among the second node and each of the at least one destination node of the first data that the first node has.

The opportunistic forwarding method for the content-based information centric network in the delay tolerant network environment may further include reflecting a value of priority for the first data assigned by the at least one destination node of the first and the second nodes to each of the first delivery predictability between the first node and the at least one destination node of the first data that the first node has and the second delivery predictability between the second node and the at least one destination node of the first data.

According to another embodiment of the present disclosure, an opportunistic forwarding apparatus for a content-based information centric network in a delay tolerant network environment is provided. The opportunistic forwarding apparatus may include a processor and a memory, a delivery predictability update unit configured to, when a first node contacts a second node, update a first delivery predictability between arbitrary nodes including the first node and the second node and a second delivery predictability between the first node and node that has data corresponding to the first interest information that the first node has based on contact record information between the first node and the second node, a message update unit configured to update a first message of the first node by comparing the first message including first interest information and first data that the first node has with a second message including second interest information and second data that the second node has, and a message delivery unit configured to deliver the first interest information that the first node has to the second node based on a delivery predictability between the first node and node that has data corresponding to the first interest information that the first node has, and to deliver first data that the first node has to the second node based on a delivery predictability between arbitrary nodes including the first node and the second node.

The opportunistic forwarding apparatus for the content-based information centric network in the delay tolerant network environment may further include when a plurality of the interest information or a plurality of pieces of data are delivered to the second node, a message sorting unit configured to sort the plurality of the interest information or the plurality of pieces of data according to a predefined criterion.

When the plurality of the interest information are delivered to the second node, the message sorting unit may be configured to sort the plurality of the interest information based on at least one of a delivery predictability between the second node and node that has data corresponding to the interest information, a value of priority assigned to the interest information, a retransmission time set when the interest information is generated, and number of hops of the interest information, and when the plurality of pieces of data are delivered to the second node, the message sorting unit may be configured to sort the plurality of data based on at least one of a delivery predictability between the second node and a destination node of the data and the value of priority assigned to the data.

According to an aspect of the present disclosure described above, delivery predictability of each node is defined into delivery predictability based on contact information between nodes and delivery predictability based on interest information that nodes have, achieving effective delivery of interest information and data compared to the convention ICN.

Additionally, information such as priority is added to the structure of interest information and data defined in the convention ICN, and opportunistic message forwarding reflecting the added information is performed, thereby building a content-based ICN in a delay tolerant network environment.

DETAILED DESCRIPTION OF EMBODIMENTS

Figure 1:
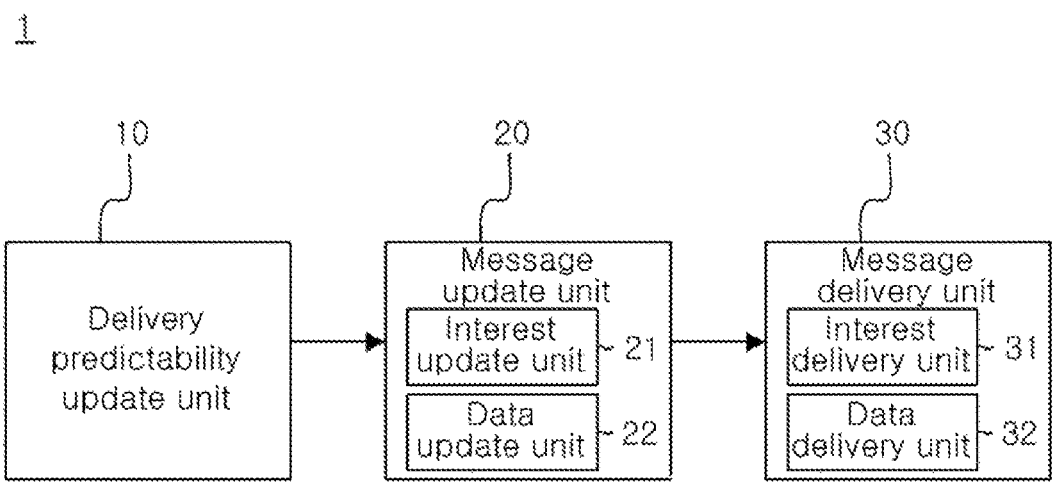
FIG. 1 is a control block diagram of an opportunistic forwarding apparatus for a content-based information centric network (ICN) in a delay tolerant network environment according to an embodiment of the present disclosure.

The present disclosure is described in detail as below with reference to the accompanying drawings in which particular embodiments for carrying out the present disclosure are shown for illustration. These embodiments are described in sufficient detail to enable those skilled in the art to practice the present disclosure. It should be understood that various embodiments of the present disclosure are different from each other, but they do not need to be exclusive. For example, a particular shape, structure and characteristic described herein, in connection with one embodiment, may be implemented in other embodiments without departing from the spirit and scope of the present disclosure. It should be further understood that modification may be made to the position or arrangement of respective elements in each disclosed embodiment without departing from the spirit and scope of the present disclosure. Therefore, the following detailed description is not intended to make in a limitative sense, and the scope of the present disclosure is only defined by the appended claims, if appropriately described, along with the full scope of equivalents to which the claims are entitled. In the drawings, similar reference numerals denote same or similar functions throughout many aspects.

The term "unit" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function.

Hereinafter, the preferred embodiments of the present disclosure will be described in more detail with reference to the accompanying drawings.

FIG. 1 is a control block diagram of an opportunistic forwarding apparatus for a content-based information centric network (ICN) in a delay tolerant network environment according to an embodiment of the present disclosure.

Referring to FIG. 1, the opportunistic forwarding apparatus 1 for a content-based ICN in a delay tolerant network environment according to an embodiment of the present disclosure includes a delivery predictability update unit 10, a message update unit 20 and a message delivery unit 30, to deliver a message that is classified into interest information and data. Particularly, the forwarding apparatus 1 according to an embodiment of the present disclosure is an apparatus for applying an ICN scheme in a delay tolerant network environment in which connectivity between nodes is not guaranteed, and may adopt an opportunistic message delivery method. Hereinafter, each component of the forwarding apparatus 1 shown in FIG. 1 will be described.

Upon contact between nodes, the delivery predictability update unit 10 may update delivery predictability of the nodes. The delivery predictability update unit 10 may update two types of delivery predictabilities. The two types of delivery predictabilities may be defined as delivery predictability between nodes and delivery predictability between a node and a node that has data corresponding to interest information that the node has. For example, upon contact of a first node and a second node, the delivery predictability update unit 10 may update delivery predictability between the first node and the second node based on contact record information of the first node and the second node. Additionally, upon contact of the first node and the second node, when data corresponding to interest information that the first node has is present in the second node, the delivery predictability update unit 10 may update delivery predictability between the first node and node that has data corresponding to interest information that the first node has.

Meanwhile, PRoPHET protocol in delay tolerant network may determine whether to deliver a message based on node contact record information. Each node maintains a table in which information about contact with other node is stored, and using this, may determine delivery predictability to meet next node. Accordingly, when node a contacts node b, delivery predictability $P(a,b) \in (0,1)$ of node a and node b may be defined by the following Equation 1.

$$P(a,b) = P(a,b)_{old} + (1 - \delta - P(a,b)_{old}) \times P_{init} \quad \text{[Equation 1]}$$

In Equation 1, $P_{init}(a,b) \in (0,1)$ is the initial constant value signifying the initial probability value by default.

If node a and node b do not contact again for a predetermined period, delivery predictability of node a and node b decreases as in the following Equation 2.

$$P(a,b)=P(a,b)_{old} \times \gamma^k \quad \text{[Equation 2]}$$

In Equation 2, $\gamma \in (0,1)$ is the attenuation factor representing how quickly the probability decrease, and k denotes the elapsed time since the last contact.

If node a and node c encounter frequently and node b and node c encounter frequently, delivery predictability of node a and node b increases as in the following Equation 3.

$$P(a,b)=P(a,b)_{old}+(1-P(a,b)_{old}) \times P(a,c) \times P(b,c) \times \beta \quad \text{[Equation 3]}$$

In Equation 3, $\beta \in (0,1)$ is the scaling factor.

Accordingly, PRoPHET protocol adopts a forwarding scheme in which if node a contacts node b, two nodes compare their own delivery predictability and other's delivery predictability, and only when other's delivery predictability is higher than their own delivery predictability, they deliver a message to other node.

As described above, the conventional delay tolerant network only defines delivery predictability between two nodes, whereas the delivery predictability update unit 10 defines two delivery predictabilities between two nodes, a node and a node that has data corresponding to interest information.

Upon contact between nodes, the message update unit 20 may update a message composed of interest information and data that the node has. The message update unit 20 may include an interest information update unit 21 to update interest information and a data update unit 22 to update data. The message update unit 20 may perform updates by comparing request node information of interest information or data that node has with request node information of the same interest information or data that the other node has. In a delay tolerant network (DTN)-information centric network (ICN) environment, there may be a plurality of request nodes that requests the same data, and there may be also a plurality of nodes that has the same data. Accordingly, upon contact between nodes, the message update unit 20 may update the same message as a message that the other node has.

Upon contact between nodes, the message delivery unit 30 may compare delivery predictability of each node and deliver a message composed of interest information and data to other node. The message delivery unit 30 may include an interest information delivery unit 31 to deliver interest information and a data delivery unit 32 to deliver data.

Specifically, the interest information delivery unit 31 may determine whether to deliver interest information to other node based on delivery predictability between a node and a node that has data corresponding to interest information that the node has among two types of delivery predictabilities. For example, upon contact of a first node and a second node, the interest information delivery unit 31 may compare delivery predictability between the first node and node that has data corresponding to interest information that the first node has, with delivery predictability between the second node and node that has data corresponding to interest information that the first node has, and based on the results, may deliver interest information from the first node to the second node. Here, interest information may have information such as request node ID, priority, initial creation time, message reception time and number of delivered hops, which is added to the structure defined in the conventional ICN. Accordingly, the interest information delivery unit 31 may enable opportunistic message forwarding reflecting information added to interest information. In relation to this, a detailed description will be provided below.

Additionally, upon contact between nodes, the data delivery unit 32 may compare delivery predictability of each node and deliver data to other node. The data delivery unit 32 may determine whether to deliver data to other node based on delivery predictability between nodes among two types of delivery predictabilities. For example, upon contact of a first node and a second node, the data delivery unit 32 may compare delivery predictability between the first node and destination node of data that the first node has, with delivery predictability between the second node and destination node of data that the first node has, and based on the results, may deliver data from the first node to the second node. Here, data may have priority information added to the structure defined in the conventional ICN. Accordingly, the data delivery unit 32 may enable opportunistic message forwarding reflecting information added to data.

Additionally, in the case of a plurality of destination nodes of data, the data delivery unit 32 may perform message forwarding according to any one of an OR strategy, an AND strategy and an AVG strategy, in which when at least one of delivery predictabilities of other node and each of the plurality of destination nodes is larger than delivery predictabilities of its own node and each of the plurality of destination nodes, the OR strategy transmits data to other node; when all delivery predictabilities are larger, the AND strategy transmits data to other node; and when an average of delivery predictabilities is larger, the AVG strategy transmits data to other node. In relation to this, a description will be made with reference to FIG. 2.

Figure 2:
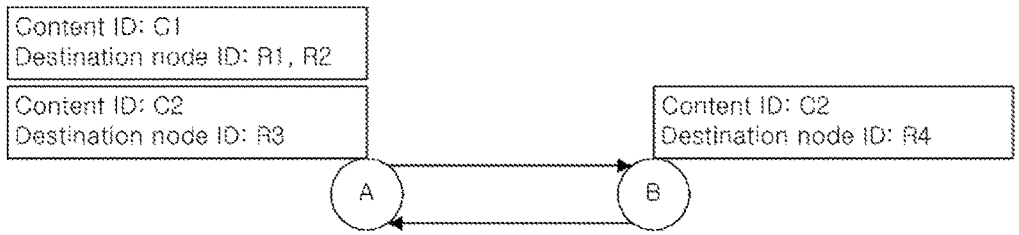
FIG. 2 is a diagram illustrating a data forwarding method in a data delivery unit shown in FIG. 1 in the case of a plurality of destination nodes of data.
Figure 2:
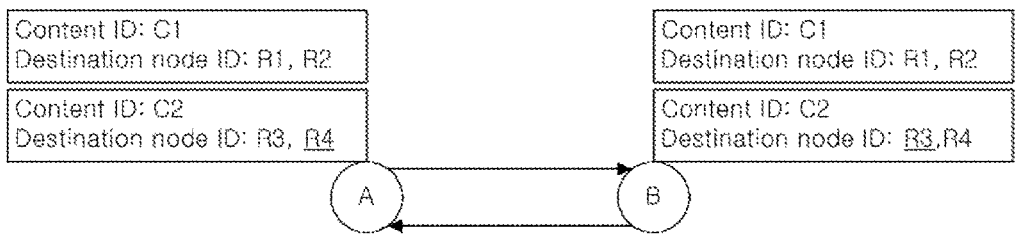

FIG. 2 is a diagram illustrating a data forwarding method in the message delivery unit shown in FIG. 1 in the case of a plurality of destination nodes of data.

Referring to FIG. 2, when a first node A has data C1 of which the destination node is R1 and R2, and data C2 of which the destination node is R3, and a second node B has data C2 of which the destination node is R4, a delivery method of data C1 from the first node A to the second node B by the data delivery unit 32 is described for instance.

First, according to an OR strategy, the data delivery unit 32 may deliver data C1 from the first node A to the second node B when delivery predictability between the second node B and any one of the destination nodes R1 and R2 of data C1 is larger than delivery predictability between the first node A and any one of R1 and R2. Referring to the table of FIG. 2, because delivery predictability of the second node B and node R1 is lower than delivery predictability of the first node A and node R1, but delivery predictability of the second node B and node R2 is higher than delivery predictability of the first node A and node R2, the data delivery unit 32 can deliver data C1 from the first node A to the second node B according to an OR strategy.

Additionally, according to an AND strategy, when all delivery predictabilities between the second node B and the destination nodes R1 and R2 of data C1 are larger than delivery predictabilities of the first node A and nodes R1 and R2, the data delivery unit 32 may deliver data C1 from the first node A to the second node B. Referring to the table of FIG. 2, because delivery predictability of the second node B and node R1 is lower than delivery predictability of the first node A and node R1, the data delivery unit 32 cannot deliver data C1 from the first node A to the second node B according to an AND strategy.

Additionally, according to an AVG strategy, when an average of delivery predictabilities between the second node B and the destination nodes R1 and R2 of data C1 is larger than an average of delivery predictabilities between the first node A and nodes R1 and R2, the data delivery unit 32 may deliver data C1 from the first node A to the second node B. Referring to the table of FIG. 2, because an average of delivery predictabilities between the second node B and nodes R1 and R2 is lower than an average of delivery predictabilities between the first node A and nodes R1 and R2, the data delivery unit 32 cannot deliver data C1 from the first node A to the second node B according to an AVG strategy.

The forwarding apparatus 1 according to an embodiment of the present disclosure defines delivery predictability of each node into delivery predictability based on contact information between the nodes and delivery predictability based on interest information that the nodes have, thereby achieving effective delivery of interest information and data compared to the conventional ICN. Additionally, the forwarding apparatus 1 adds information such as priority to the structure of interest information and data defined in the conventional ICN and enables opportunistic message forwarding reflecting the added information, thereby building a content-based ICN in a delay tolerant network environment.

Hereinafter, an opportunistic forwarding method for a content-based ICN in a delay tolerant network environment according to an embodiment of the present disclosure will be described with reference to FIGS. 3 to 16.

FIGS. 3 to 16 are flowcharts of the opportunistic forwarding method for a content-based ICN in a delay tolerant network environment according to an embodiment of the present disclosure.

The forwarding method according to an embodiment of the present disclosure may proceed in substantially the same configuration as the forwarding apparatus 1 of FIG. 1. Thus, a first node A and a second node B have the forwarding apparatus 1 shown in FIG. 1, and when the first node A contacts the second node B, a method for forwarding a message from the first node A to the second node B will be described.

Figure 3:
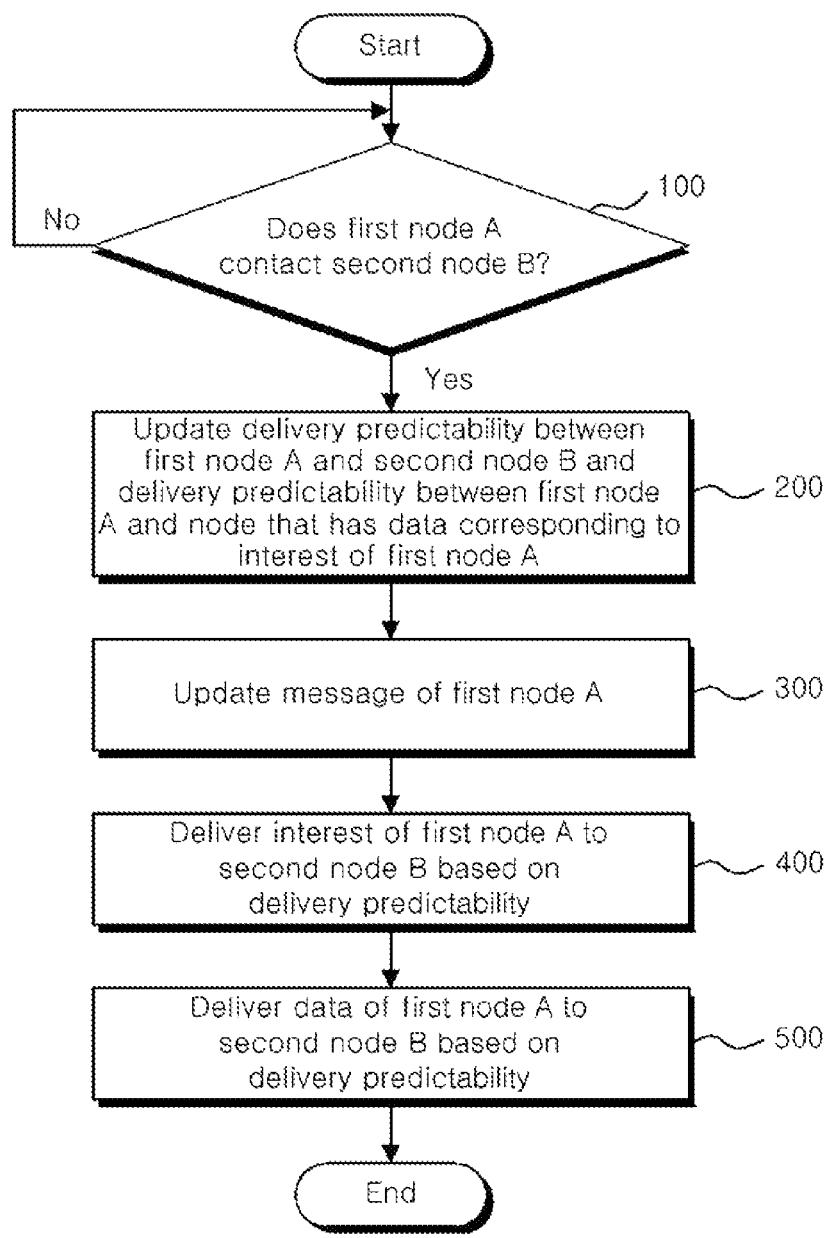
FIGS. 3 to 16 are flowcharts of an opportunistic forwarding method for a content-based ICN in a delay tolerant network environment according to an embodiment of the present disclosure.

First, referring to FIG. 3, when the first node A contacts the second node B (100), the delivery predictability update unit 10 may update delivery predictability between the first node A and the second node B and delivery predictability between the first node A and node that has data corresponding to interest information of the first node A (200). In relation to this, a detailed description will be provided with reference to FIG. 4 below.

The message update unit 20 may update a message of the first node A (300). In relation to this, a detailed description will be provided with reference to FIGS. 5 and 6 below.

The interest information delivery unit 31 may deliver interest information of the first node A to the second node B based on delivery predictability (400). In relation to this, a detailed description will be provided with reference to FIGS. 7 to 10 below.

The data delivery unit 32 may deliver data of the first node A to the second node B based on delivery predictability (500). In relation to this, a detailed description will be provided with reference to FIGS. 11 to 16 below.

Figure 4:
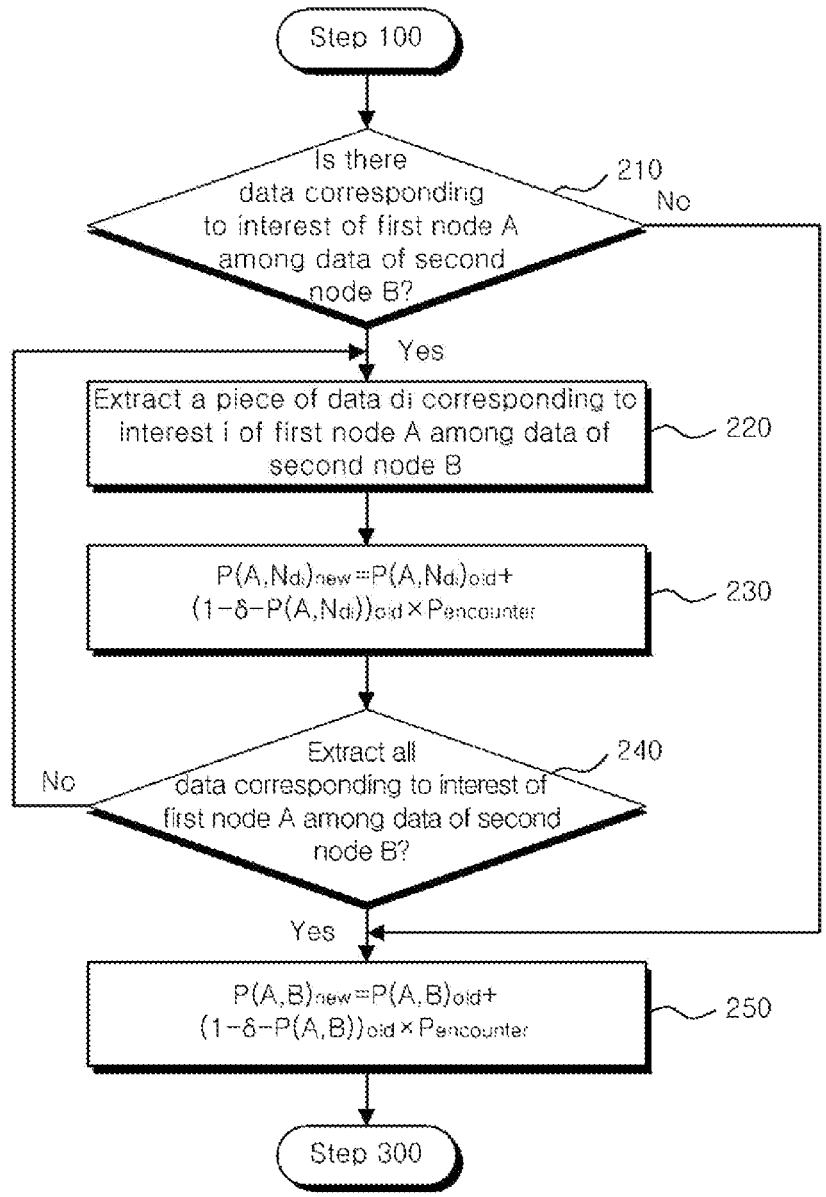

Referring to FIG. 4, a delivery predictability update method of the forwarding method according to an embodiment of the present disclosure is described.

The delivery predictability update unit 10 may determine if there is data corresponding to interest information that the first node A has among data that the second node B has (210).

When there is data corresponding to interest information that the first node A has among data that the second node B has, the delivery predictability update unit 10 may extract a piece of data $d_i$ corresponding to interest information i that the first node A has among data that the second node B has (220).

The delivery predictability update unit 10 may update delivery predictability between the first node A and node $N_{di}$ that has data $d_i$ corresponding to interest information i of the first node A (230). The delivery predictability update unit 10 may update delivery predictability between the first node A and node $N_{di}$ that has data di corresponding to interest information i of the first node A according to a delivery predictability calculation method based on contact history of the two nodes, as in the following Equation 4.

$$P(A,N_{d_i})_{new}=P(A,N_{d_i})_{old}+(1-\delta-P(A,N_{d_i}))_{old}\times P_{encounter} \quad \text{[Equation 4]}$$

Generally, because there is a plurality of nodes $N_{di}$ that has data $d_i$, delivery predictability that is updated according to Equation 4 may be updated differently from delivery predictability that is calculated according to Equation 5 as described below. In this instance, delivery predictability between two nodes $N_{di}$ that have data $d_i$ is defined as 1.

The delivery predictability update unit 10 may extract a piece of data $d_i$ corresponding to interest information i that the first node A has among data that the second node B has (220), and update delivery predictability between the first node A and node $N_{di}$ that has data $d_i$ corresponding to interest information i of the first node A (230), and may repeat this process until it extracts all data corresponding to interest information that the first node A has among data that the second node B has (240).

Meanwhile, when the delivery predictability update unit 10 extracts all data corresponding to interest information that the first node A has among data that the second node B has (240), the delivery predictability update unit 10 may update delivery predictability between the first node A and the second node B (250). The delivery predictability update unit 10 may update delivery predictability between the first node A and the second node B according to a delivery predictability calculation method based on contact history of two nodes, as in the following Equation 5.

$$P(A,B)_{new}=P(A,B)_{old}+(1-\delta-P(A,B))_{old}\times P_{encounter} \quad \text{[Equation 5]}$$

Figure 5:
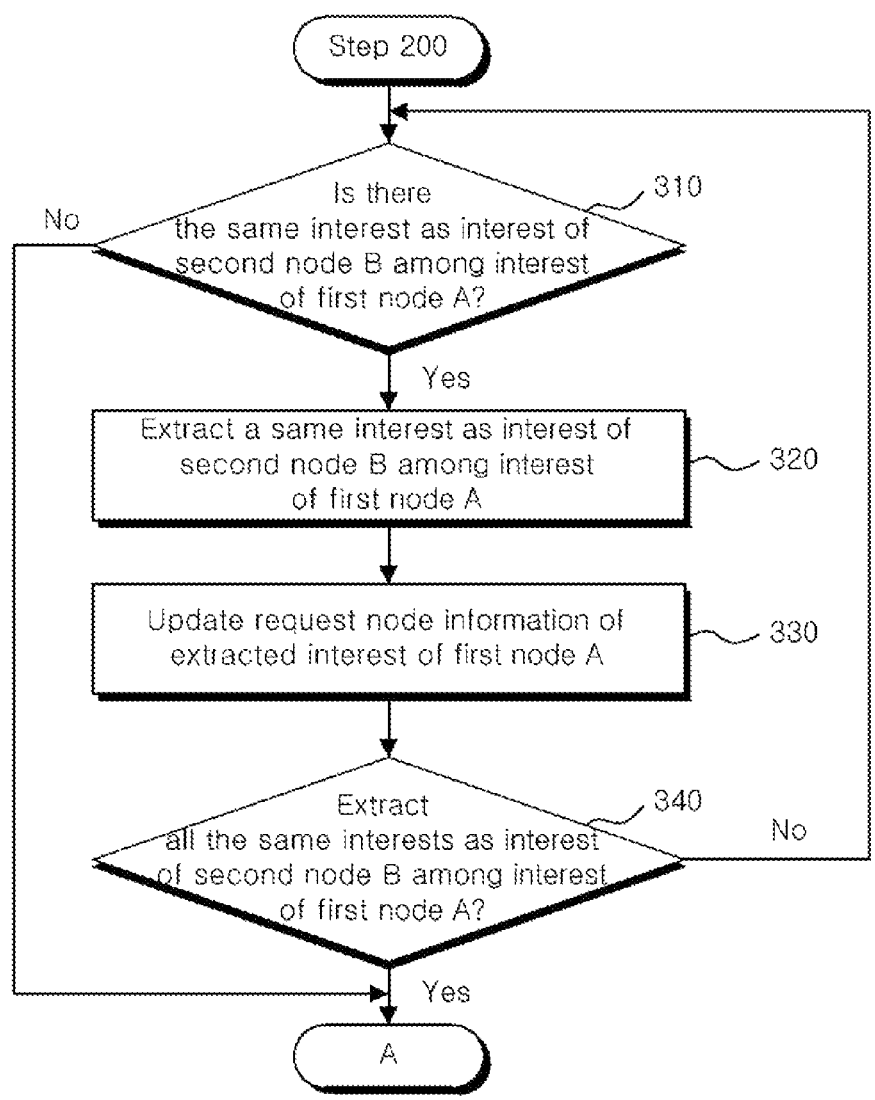
Figure 6:
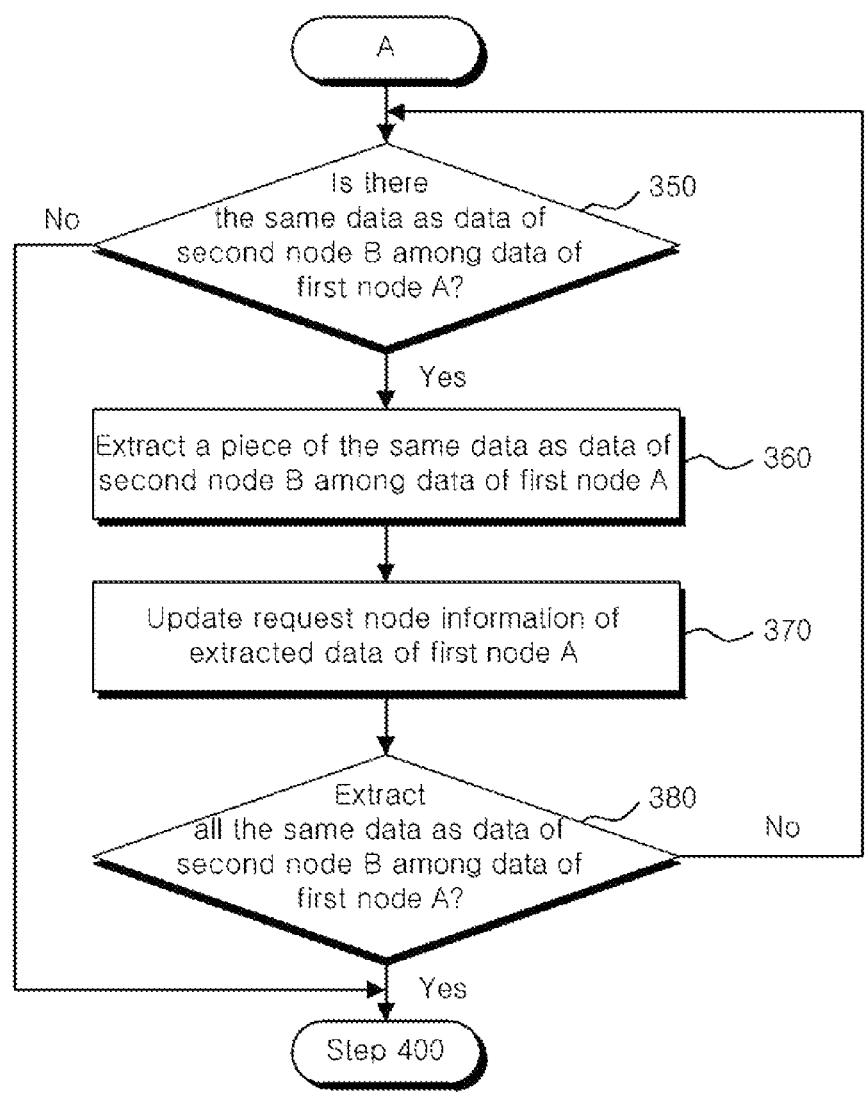

Referring to FIGS. 5 and 6, a message update method of the forwarding method according to an embodiment of the present disclosure is described.

Referring to FIG. 5, the interest information update unit 21 may determine if there is the same interest information as interest information that the second node B has among interest information that the first node A has (310).

When it is determined that there is the same interest information as the interest information that the second node B has among interest information that the first node A has (310), the interest information update unit 21 may extract a same interest information as interest information that the second node B has among interest information that the first node A has (320).

The interest information update unit 21 may update request node information of the extracted interest information of the first node A (330). The interest information update unit 21 may add request node information of the corresponding interest information of the second node B to request node information of the extracted interest information of the first node A. For example, when request node information of the extracted interest information i of the first node A is R1 and request node information of interest information i of the second node B is R2, the interest information update unit 21 may add information of R2 to request node information of the extracted interest information i of the first node A. Alternatively, when request node information of the extracted interest information i of the first node A is R1 and R2 and request node information of interest information i of the second node B is R2, R3 and R4, the interest information update unit 21 may only add information of R3 and R4 to request node information of the extracted interest information i of the first node A.

The interest information update unit 21 may repeat the updates of request node information of interest information that the first node A has until it extracts all interest information that the second node B has among interest information that the first node A has (340).

Referring to FIGS. 5 and 6, when there is no same interest information as interest information of the second node B among interest information of the first node A (310), or the interest information update unit 21 extracts all interest information that the second node B has among interest information that the first node A has (340), the data update unit 22 may determine if there is the same data as data that the second node B has among data that the first node A has (350).

When it is determined that there is the same data as data that the second node B has among data that the first node A has (350), the data update unit 22 may extract a piece of the same data as data that the second node B has among data that the first node A has (360).

The data update unit 22 may update request node information of the extracted data of the first node A (370). The data update unit 22 may add request node information of the corresponding data of the second node B to request node information, i.e., destination node information of the extracted data of the first node A.

The data update unit 22 may repeat the updates of request node information of data that the first node A has until it extracts all data that the second node B has among data that the first node A has (380). Referring to FIGS. 7 to 10, an interest information delivery method of the forwarding method according to an embodiment of the present disclosure is described. Additionally, referring to FIGS. 11 to 16, a data delivery method of the forwarding method according to an embodiment of the present disclosure is described. The message delivery unit 30 may deliver interest information to other node according to any one of the methods shown in FIGS. 7 to 10, and deliver data to other node according to any one of the methods shown in FIGS. 11 to 16.

Figure 7:
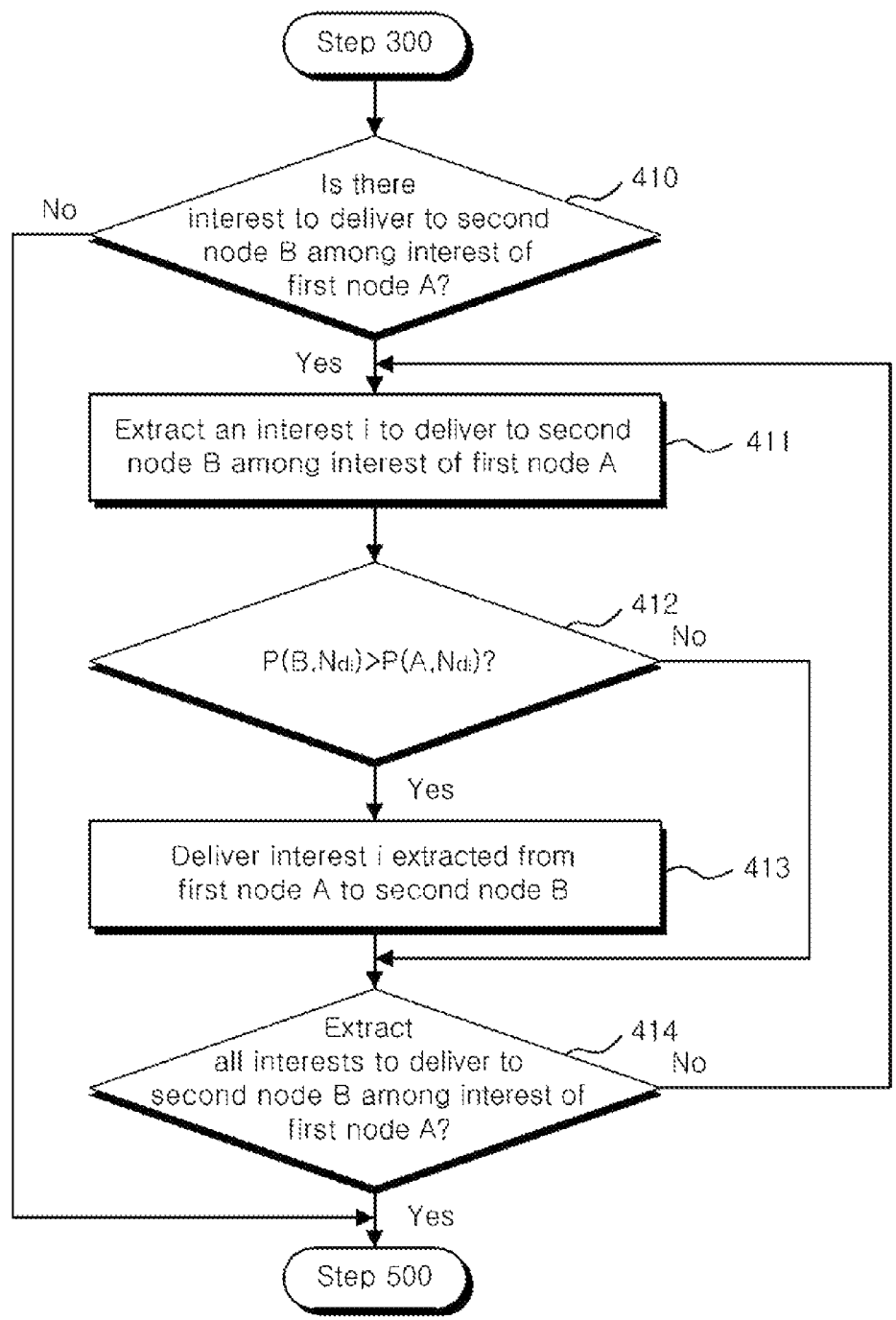
Figure 8:
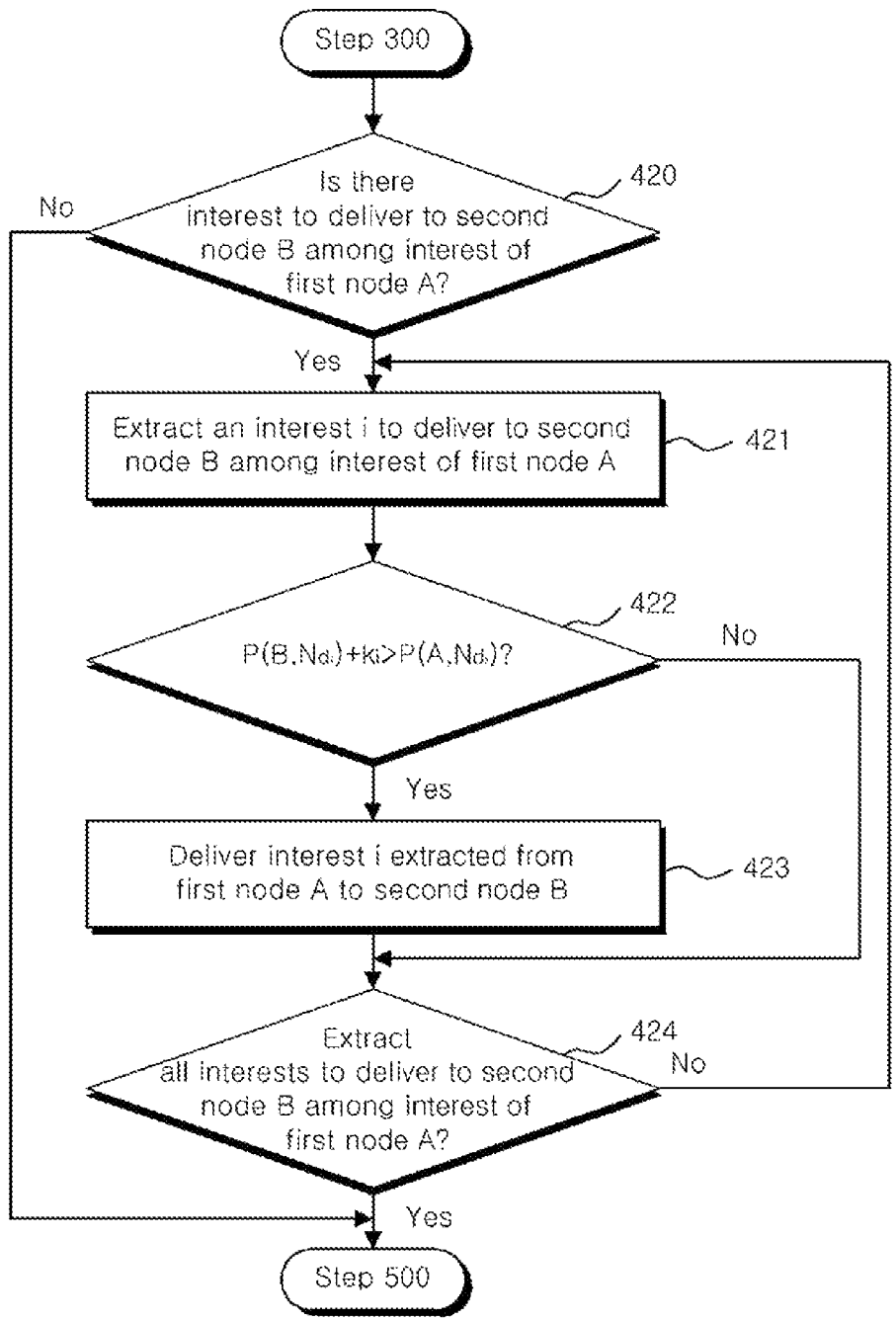

First, seeing the interest information delivery method by the interest information delivery unit 31, the interest information delivery unit 31 delivers interest information between nodes by a message delivery method based on delivery predictability comparison of PRoPHET protocol, and as in FIG. 7, the interest information delivery unit 31 may compare delivery predictability between a node and a node that has data corresponding to interest information that the node has, or as in FIG. 8, may compare delivery predictability after reflecting priority information added to interest information on the delivery predictability. Further, in addition to delivery predictability comparison between nodes, the interest information delivery unit 31 may determine whether to deliver a message between nodes, reflecting initial creation time, message reception time and retransmission time added to interest information, as in FIGS. 9 and 10.

Specifically, referring to FIG. 7, the interest information delivery unit 31 may determine if there is interest information to deliver to the second node B among interest information that the first node A has (410). The interest information delivery unit 31 may determine if there is interest information to deliver to the second node B among interest information that the first node A has according to the communication scheme in the conventional ICN.

When it is determined that there is interest information to deliver to the second node B among interest information that the first node A has (410), the interest information delivery unit 31 may extract an interest information i to deliver to the second node B among interest information that the first node A has (411).

The interest information delivery unit 31 may compare delivery predictability between the first node A and node $N_{di}$ that has data $d_i$ corresponding to the extracted interest information i, with delivery predictability between the second node B and node $N_{di}$ that has data $d_i$ corresponding to the extracted interest information i, as in the following Equation 6 (412).

$$P(B,N_{d_i}) > P(A, N_{d_i}) \qquad \text{[Equation 6]}$$

Only when delivery predictability between the second node B and node $N_{di}$ that has data $d_i$ corresponding to the extracted interest information i is larger than delivery predictability between the first node A and node $N_{di}$ that has data $d_i$ corresponding to the extracted interest information i (412), the interest information delivery unit 31 may deliver the interest information i extracted from the first node A to the second node B (413).

The interest information delivery unit 31 may repeat the above described delivery of interest information that the first node A has to the second node B until it extracts all interest information to deliver to the second node B among interest information that the first node A has (414).

Referring to FIG. 8, the interest information delivery unit 31 may determine if there is interest information to deliver to the second node B among interest information that the first node A has (420). The interest information delivery unit 31 may determine if there is interest information to deliver to the second node B among interest information that the first node A has according to the communication scheme in the conventional ICN.

When it is determined that there is interest information to deliver to the second node B among interest information that the first node A has (420), the interest information delivery unit 31 may extract an interest information i to deliver to the second node B among interest information that the first node A has (421).

The interest information delivery unit 31 may compare delivery predictability between the first node A and node $N_{di}$ that has data $d_i$ corresponding to the extracted interest information i, with a value obtained by adding a value $k_i$ of priority assigned to the extracted interest information i to delivery predictability between the second node B and node $N_{di}$ that has data $d_i$ corresponding to the extracted interest information i, as in the following Equation 7 (422).

$$P(B, N_{d_i}) + k_i > P(A, N_{d_i}) \qquad \text{[Equation 7]}$$

The request node that creates interest information may assign priority to the interest information according to the characteristics of the corresponding data. For example, when the request node needs to receive data quickly, the request node may assign priority to the corresponding interest information. The priority assigned to interest information may be represented by the priority term k∈[0,1], and it means that as k becomes larger, priority increases. That is, the initial value of k is set to 0, and the request node may set k to a larger value as the request for data is more urgent.

Only when a value obtained by adding a value $k_i$ of priority assigned to the extracted interest information i to delivery predictability between the second node B and node $N_{di}$ that has data $d_i$ corresponding to the extracted interest information i is larger than delivery predictability between the first node A and node $N_{di}$ that has data $d_i$ corresponding to the extracted interest information i (422), the interest information delivery unit 31 may deliver the interest information i extracted from the first node A to the second node B (423).

The interest information delivery unit 31 may repeat the above described delivery of interest information that the first node A has to the second node B until it extracts all interest information to deliver to the second node B among interest information that the first node A has (424).

Figure 9:
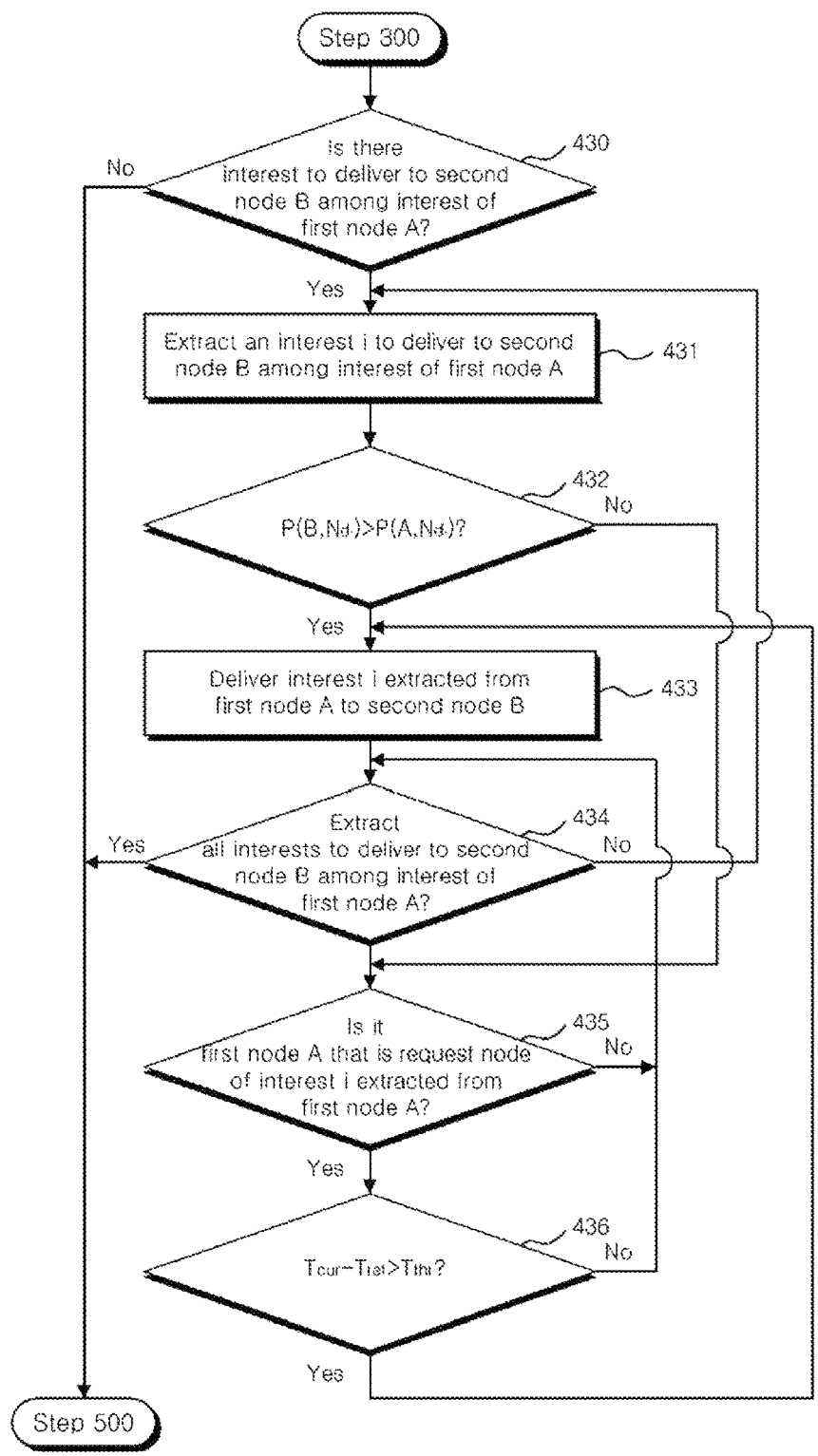

Referring to FIG. 9, the interest information delivery unit 31 may determine if there is interest information to deliver to the second node B among interest information that the first node A has (430). The interest information delivery unit 31 may determine if there is interest information to deliver to the second node B among interest information that the first node A has according to the communication scheme in the conventional ICN.

When it is determined that there is interest information to deliver to the second node B among interest information that the first node A has (430), the interest information delivery unit 31 may extract an interest information i to deliver to the second node B among interest information that the first node A has (431).

The interest information delivery unit 31 may compare delivery predictability between the first node A and node $N_{di}$ that has data $d_i$ corresponding to the extracted interest information i, with delivery predictability between the second node B and node $N_{di}$ that has data $d_i$ corresponding to the extracted interest information i, as in the above Equation 6 (432).

When delivery predictability between the second node B and node $N_{di}$ that has data $d_i$ corresponding to the extracted interest information i is larger than delivery predictability between the first node A and node $N_{di}$ that has data $d_i$ corresponding to the extracted interest information i (432), the interest information delivery unit 31 may deliver the interest information i extracted from the first node A to the second node B (433).

On the contrary, when delivery predictability between the second node B and node $N_{di}$ that has data $d_i$ corresponding to the extracted interest information i is not larger than delivery predictability between the first node A and node $N_{di}$ that has data $d_i$ corresponding to the extracted interest information i (432), the interest information delivery unit 31 may determine if the request node of the extracted interest information i is the first node A (435).

When the request node of the interest information i extracted from the first node A is determined to be the first node A (435), the interest information delivery unit 31 may determine if the retransmission time $T_{thr}$ set for the interest information i by the first node A has elapsed since the point in time at which the extracted interest information i was created or the extracted interest information i was retransmitted, as in the following Equation 8 (436).

$$T_{cur}-T_{ret}>T_{thr} \qquad \text{[Equation 8]}$$

When creating interest information, the request node may add the retransmission time $T_{thr}$. When data corresponding to the interest information is not delivered after the interest information is created or transmitted, the request node may retransmit the interest information to other node every retransmission time ($T_{thr}$) added to the interest information when creating the interest information irrespective of delivery predictability.

When the time computed by subtracting the time at which interest information i was created or interest information i was retransmitted ($T_{ret}$) from the current time $T_{cur}$ is larger than the retransmission time $T_{thr}$ of interest information i set by the first node A (436), the interest information delivery unit 31 may deliver the interest information i extracted from the first node A to the second node B (433).

The interest information delivery unit 31 may repeat the above described delivery of interest information that the first node A has to the second node B until it extracts all interest information to deliver to the second node B among interest information that the first node A has (434).

Figure 10:
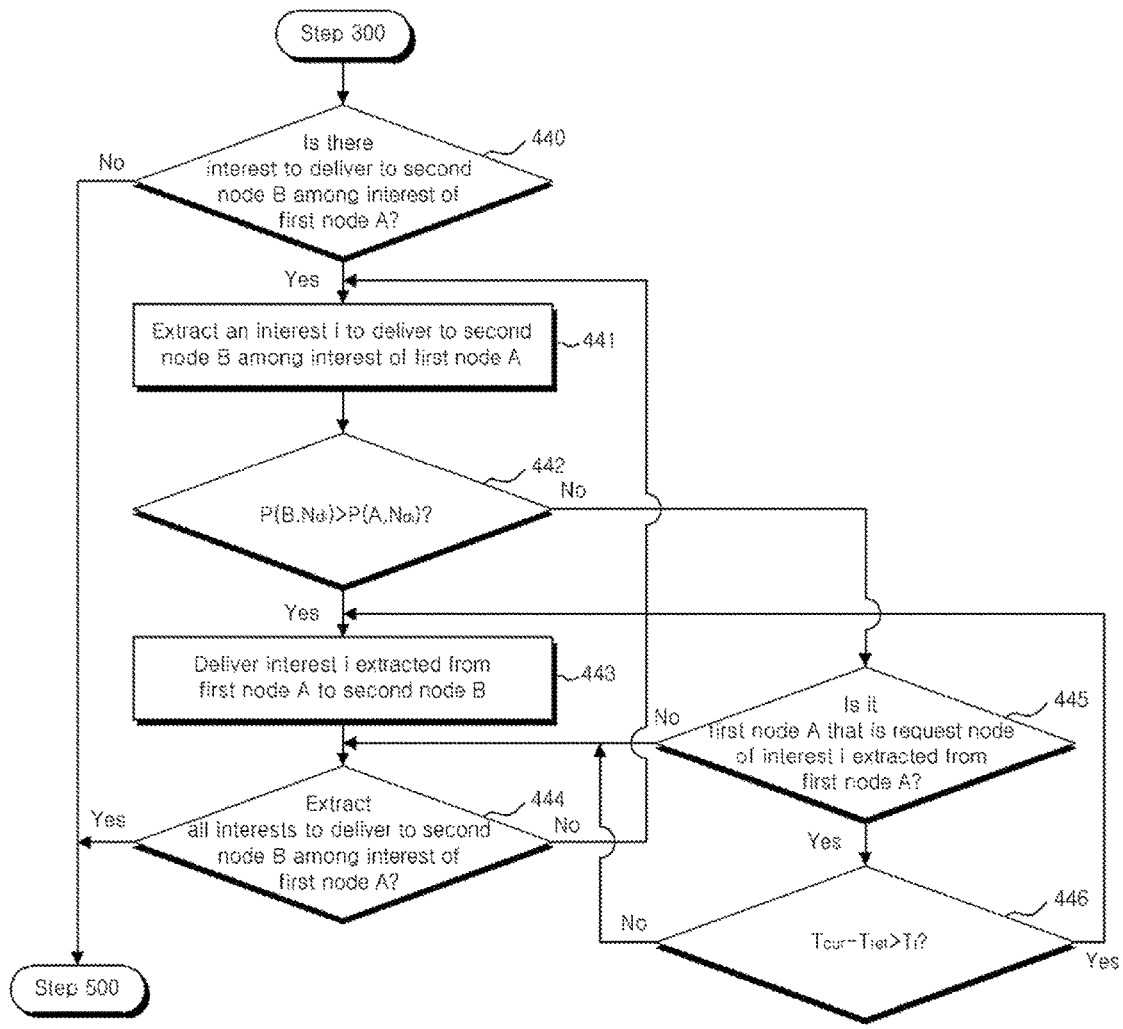

Referring to FIG. 10, the interest information delivery unit 31 may determine if there is interest information to deliver to the second node B among interest information that the first node A has (440). The interest information delivery unit 31 may determine if there is interest information to deliver to the second node B among interest information that the first node A has according to the communication scheme in the conventional ICN.

When it is determined that there is interest information to deliver to the second node B among interest information that the first node A has (440), the interest information delivery unit 31 may extract an interest information i to deliver to the second node B among interest information that the first node A has (441).

The interest information delivery unit 31 may compare delivery predictability between the first node A and node $N_{di}$ that has data $d_i$ corresponding to the extracted interest information i with delivery predictability between the second node B and node $N_{di}$ that has data $d_i$ corresponding to the extracted interest information i, as in the above Equation 6 (442).

When delivery predictability between the second node B and node $N_{di}$ that has data $d_i$ corresponding to the extracted interest information i is larger than delivery predictability between the first node A and node $N_{di}$ that has data $d_i$ corresponding to the extracted interest information i (442), the interest information delivery unit 31 may deliver the interest information i extracted from the first node A to the second node B (443).

On the contrary, when delivery predictability between the second node B and node $N_{di}$ that has data $d_i$ corresponding to the extracted interest information i is not larger than delivery predictability between the first node A and node $N_{di}$ that has data $d_i$ corresponding to the extracted interest information i (442), the interest information delivery unit 31 may determine if the request node of the extracted interest information i is the first node A (445).

When the request node of the interest information i extracted from the first node A is determined to be the first node A (445), the interest information delivery unit 31 may determine if the retransmission time $T_i$ set by the first node A based on priority of interest information i has elapsed from the point in time at which the extracted interest information i was created or the extracted interest information i was retransmitted, as in the following Equation 9 (446).

$$T_{cur}-T_{ret}>T_i \qquad \text{[Equation 9]}$$

The request node may add the retransmission time $T_i$ reflecting priority according to the following Equation 10 when creating interest information.

$$T_{i,new} = T_{i,old} \times f(k_i) \quad \text{[Equation 10]}$$

In Equation 10, $f(k_i)$ is a function that becomes smaller as priority is higher. According to Equation 10, as priority is higher, the retransmission may be shorter.

When the time computed by subtracting the time at which interest information i was created or interest information i was retransmitted $T_{ret}$ from the current time $T_{cur}$ is larger than the retransmission time $T_i$ set by the first node A based on priority of interest information i (446), the interest information delivery unit 31 may deliver the interest information i extracted from the first node A to the second node B (443).

The interest information delivery unit 31 may repeat the above described delivery of interest information that the first node A has to the second node B until it extracts all interest information to deliver to the second node B among interest information that the first node A has (444).

Subsequently, seeing a data delivery method by the data delivery unit 32, the data delivery unit 32 delivers data between nodes by a message delivery method based on delivery predictability comparison of PRoPHET protocol, and as in FIGS. 11 to 14, the data delivery unit 32 may compare delivery predictability between a node and a destination node of data. Further, as in FIGS. 15 and 16, the data delivery unit 32 may compare delivery predictability after reflecting priority information added to interest information that requested data on the delivery predictability.

Figure 11:
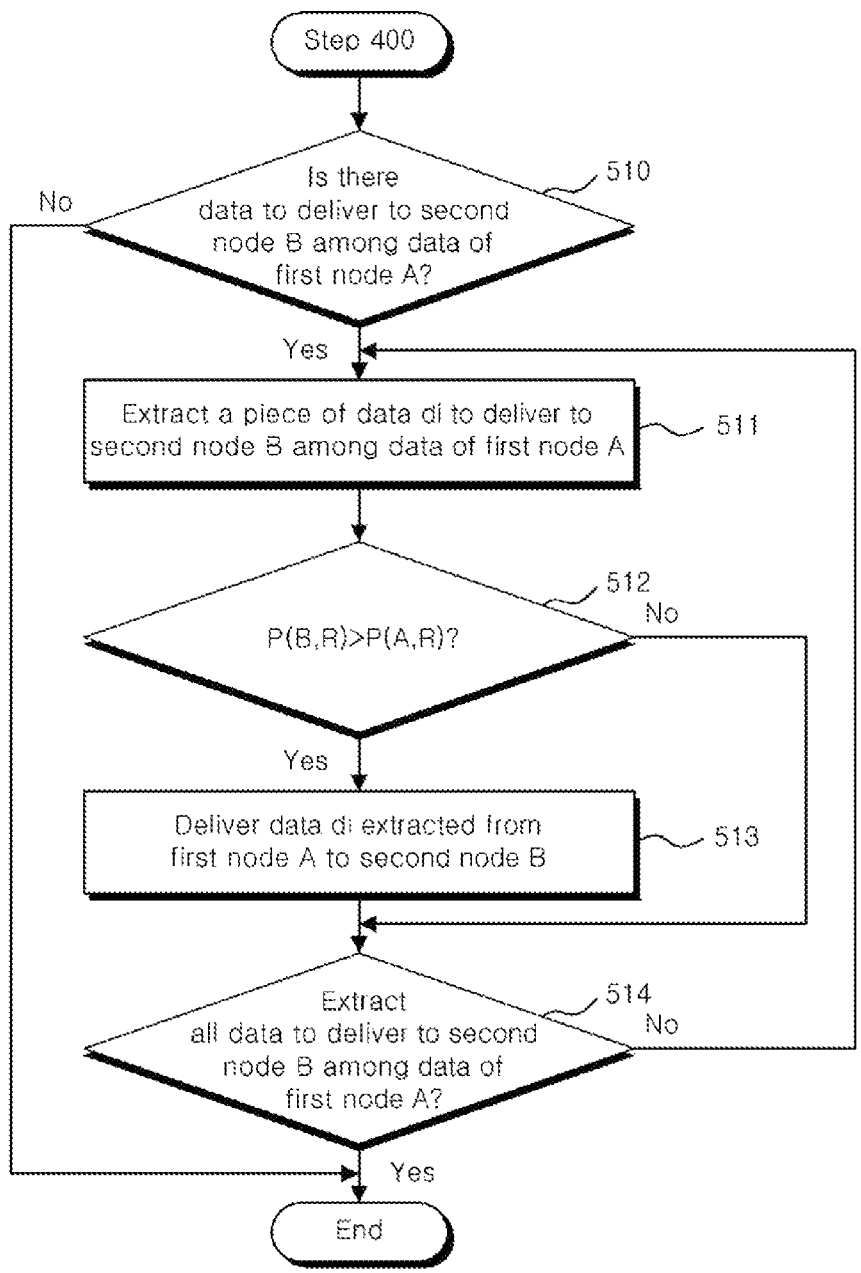

Specifically, referring to FIG. 11, the data delivery unit 32 may determine if there is data to deliver to the second node B among data that the first node A has (510). The data delivery unit 32 may determine if there is data to deliver to the second node B among data that the first node A has according to the communication scheme in the conventional ICN.

When it is determined that there is data to deliver to the second node B among data that the first node A has (510), the data delivery unit 32 may extract a piece of data $d_i$ to deliver to the second node B among data that the first node A has (511).

The data delivery unit 32 may compare delivery predictability between the first node A and destination node R of the extracted data $d_i$, with delivery predictability between the second node B and destination node R of the extracted data $d_i$, as in the following Equation 11 (512).

$$P(B, R) > P(A, R) \quad \text{[Equation 11]}$$

Here, the destination node R of data $d_i$ means a request node that created interest information i to request the data $d_i$.

Only when delivery predictability between the second node B and destination node R of the extracted data $d_i$ is larger than delivery predictability between the first node A and destination node R of the extracted data $d_i$ (512), the data delivery unit 32 may deliver the data $d_i$ extracted from the first node A to the second node B (513).

The data delivery unit 32 may repeat the above described delivery of data that the first node A has to the second node B until it extracts all data to deliver to the second node B among data that the first node A has (514).

Figure 12:
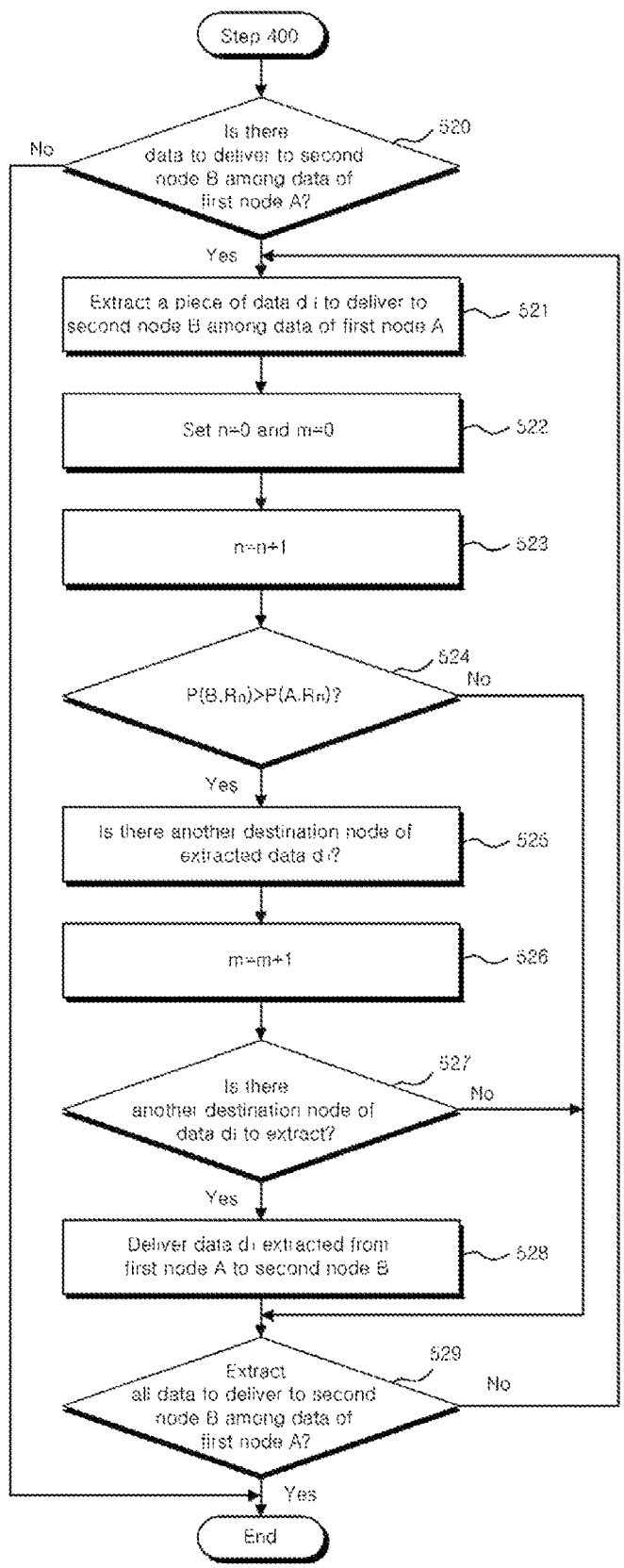

FIGS. 12 to 16 show a data delivery method that can be used in the case of a plurality of destination nodes of data, i.e., a plurality of request nodes, and first, referring to FIG. 12, the data delivery unit 32 may determine if there is data to deliver to the second node B among data that the first node A has (520). The data delivery unit 32 may determine if there is data to deliver to the second node B among data that the first node A has according to the communication scheme in the conventional ICN.

When it is determined that there is data to deliver to the second node B among data that the first node A has (520), the data delivery unit 32 may extract a piece of data $d_i$ to deliver to the second node B among data that the first node A has (521).

The data delivery unit 32 may set to n=0 and m=0 (522), and update to n=n+1 (523). Here, n is a variable for identifying a plurality of destination nodes, and m is a variable representing the number of cases that satisfy the delivery predictability condition.

The data delivery unit 32 may compare delivery predictability between the first node A and destination node $R_n$ of the extracted data $d_i$ with delivery predictability between the second node B and destination node $R_n$ of the extracted data $d_i$, as in the following Equation 12 (524).

$$P(B, R_n) > P(A, R_n) \quad \text{[Equation 12]}$$

When delivery predictability between the second node B and destination node $R_n$ of the extracted data $d_i$ is larger than delivery predictability between the first node A and destination node $R_n$ of the extracted data $d_i$ (524), the data delivery unit 32 may update to m=m+1 (525).

When there is another destination node of the extracted data $d_i$ (526), the data delivery unit 32 may repeat the above described comparison of delivery predictability all over the other destination nodes of the extracted data $d_i$.

When comparison of delivery predictability for all destination nodes of the extracted data ($d_i$) is completed, the data delivery unit 32 may determine if m is the same as n (527).

That is, only when delivery predictability between the second node B and all destination nodes of the extracted data $d_i$ is larger than delivery predictability between the first node A and all destination nodes of the extracted data $d_i$ (527), the data delivery unit 32 may deliver the data $d_i$ extracted from the first node A to the second node B (528).

The data delivery unit 32 may repeat the above described delivery of data that the first node A has to the second node B until it extracts all data to deliver to the second node B among data that the first node A has (529).

Figure 13:
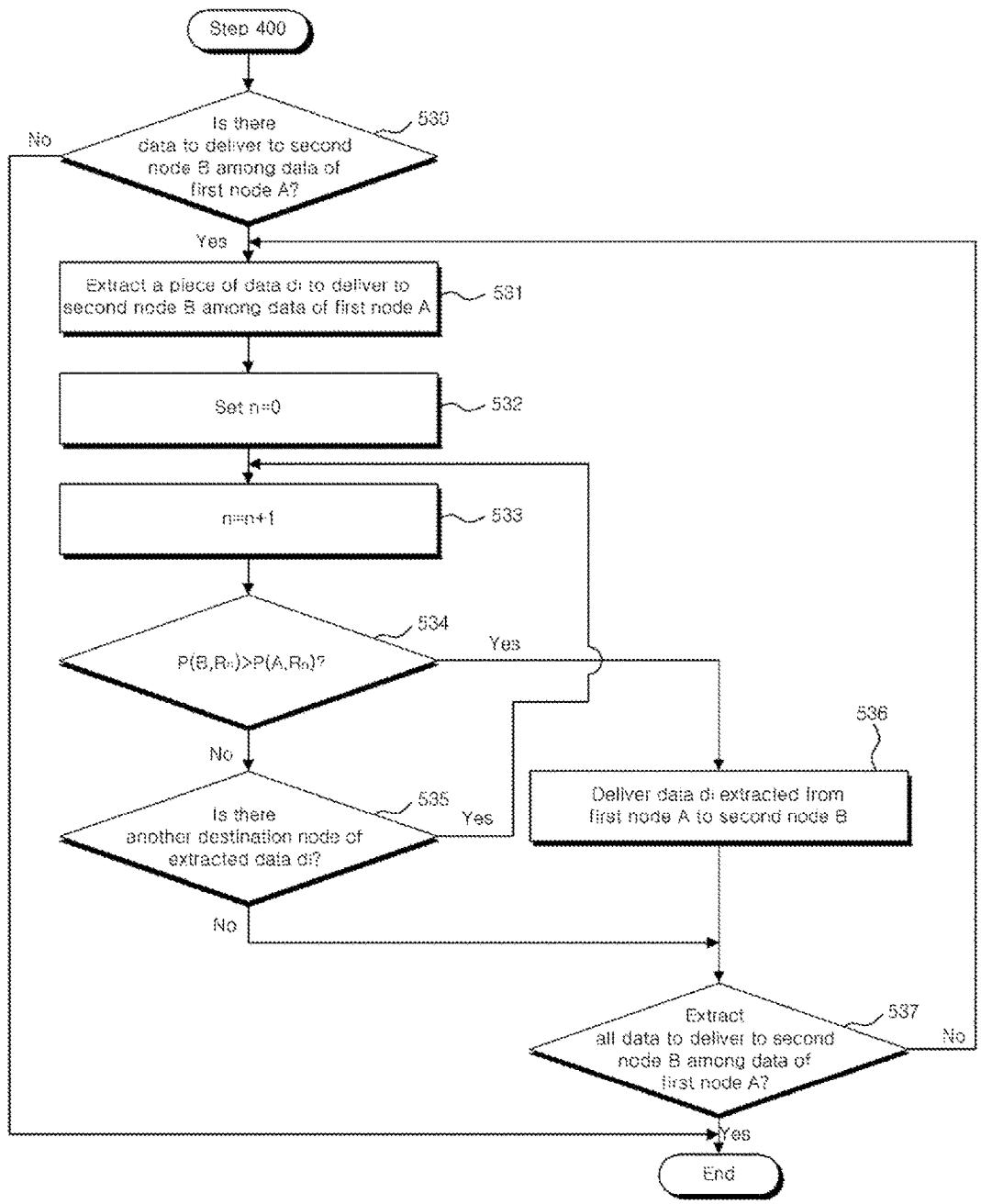

Alternatively, referring to FIG. 13, the data delivery unit 32 may determine if there is data to deliver to the second node B among data that the first node A has (530). The data delivery unit 32 may determine if there is data to deliver to the second node B among data that the first node A has according to the communication scheme in the conventional ICN.

When it is determined that there is data to deliver to the second node B among data that the first node A has (530), the data delivery unit 32 may extract a piece of data $d_i$ to deliver to the second node B among data that the first node A has (531).

The data delivery unit 32 may set to n=0 (532), and update to n=n+1 (533).

The data delivery unit 32 may compare delivery predictability between the first node A and destination node $R_n$ of the extracted data $d_i$ with delivery predictability between the second node B and destination node $R_n$ of the extracted data $d_i$, as in the above Equation 12 (534).

When delivery predictability between the second node B and destination node $R_n$ of the extracted data $d_i$ is larger than delivery predictability between the first node A and destination node $R_n$ of the extracted data $d_i$ (534), the data delivery unit 32 may deliver the data $d_i$ extracted from the first node A to the second node B (536).

On the contrary, when delivery predictability between the second node B and destination node $R_n$ of the extracted data $d_i$ is not larger than delivery predictability between the first node A and destination node $R_n$ of the extracted data $d_i$ (534), the data delivery unit 32 may determine if there is another destination node of the extracted data $d_i$ (535), and perform the above described comparison of delivery predictability on all other destination nodes of the extracted data $d_i$.

That is, when delivery predictability between the second node B and any one of a plurality of destination nodes of the extracted data $d_i$ is larger than delivery predictability between the first node A and the corresponding destination node of the extracted data $d_i$, the data delivery unit 32 may deliver the data $d_i$ extracted from the first node A to the second node B (536).

The data delivery unit 32 may repeat the above described delivery of data that the first node A has to the second node B until it extracts all data to deliver to the second node B among data that the first node A has (537).

Figure 14:
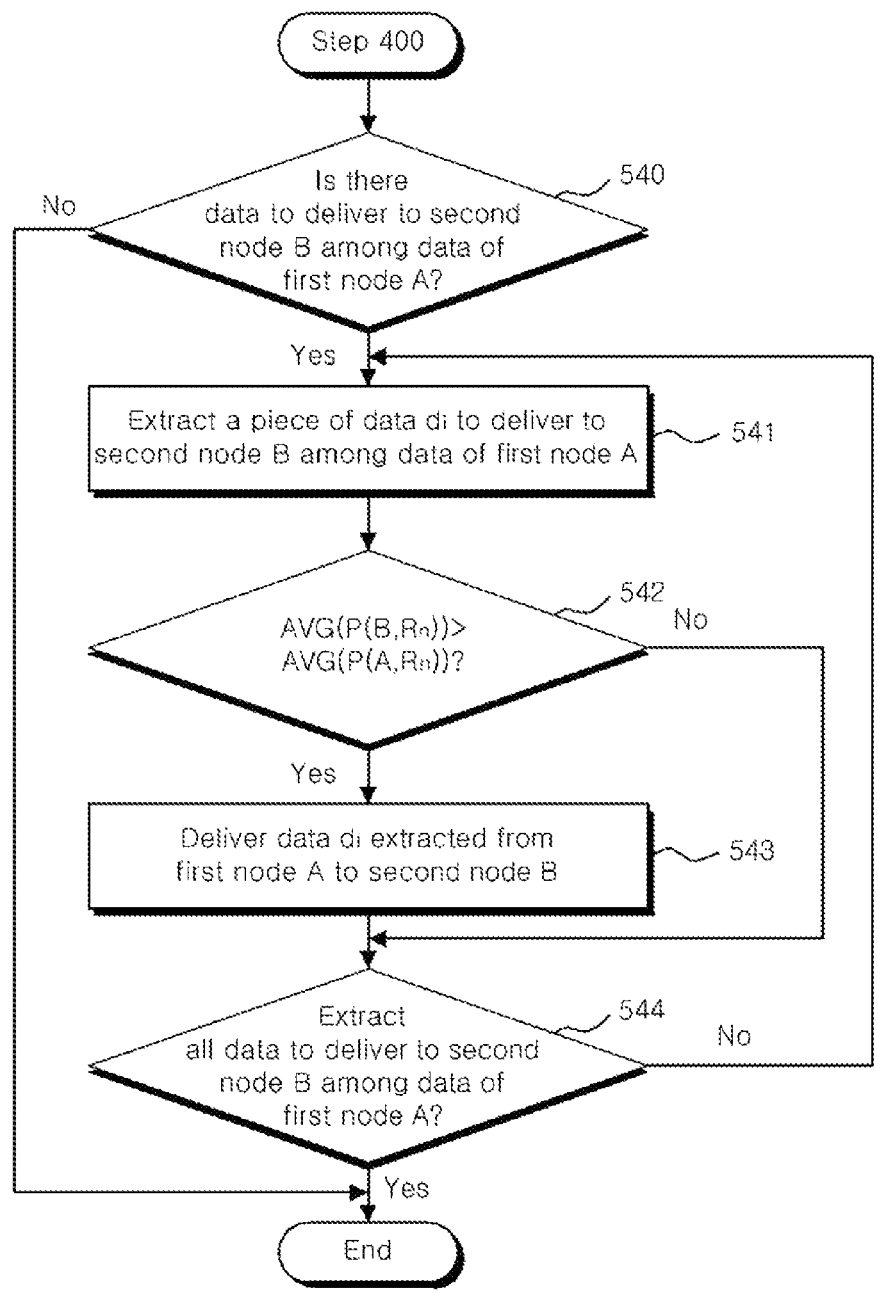

Alternatively, referring to FIG. 14, the data delivery unit 32 may determine if there is data to deliver to the second node B among data that the first node A has (540). The data delivery unit 32 may determine if there is data to deliver to the second node B among data that the first node A has according to the communication scheme in the conventional ICN.

When it is determined that there is data to deliver to the second node B among data that the first node A has (540), the data delivery unit 32 may extract a piece of data $d_i$ to deliver to the second node B among data that the first node A has (541).

The data delivery unit 32 may compare an average of delivery predictabilities between the first node A and all destination nodes $R_n$ of the extracted data $d_i$, with an average of delivery predictabilities between the second node B and all destination nodes $R_n$ of the extracted data $d_i$, as in the following Equation 13 (542).

$$AVG(P(B, R_n)) > AVG(P(A, R_n)) \qquad \text{[Equation 13]}$$

Only when an average of delivery predictabilities between the second node B and all destination nodes $R_n$ of the extracted data $d_i$ is larger than an average of delivery predictabilities between the first node A and destination nodes $R_n$ of the extracted data $d_i$ (542), the data delivery unit 32 may deliver the data $d_i$ extracted from the first node A to the second node B (543).

The data delivery unit 32 may repeat the above described delivery of data that the first node A has to the second node B until it extracts all data to deliver to the second node B among data that the first node A has (544).

Figure 15:
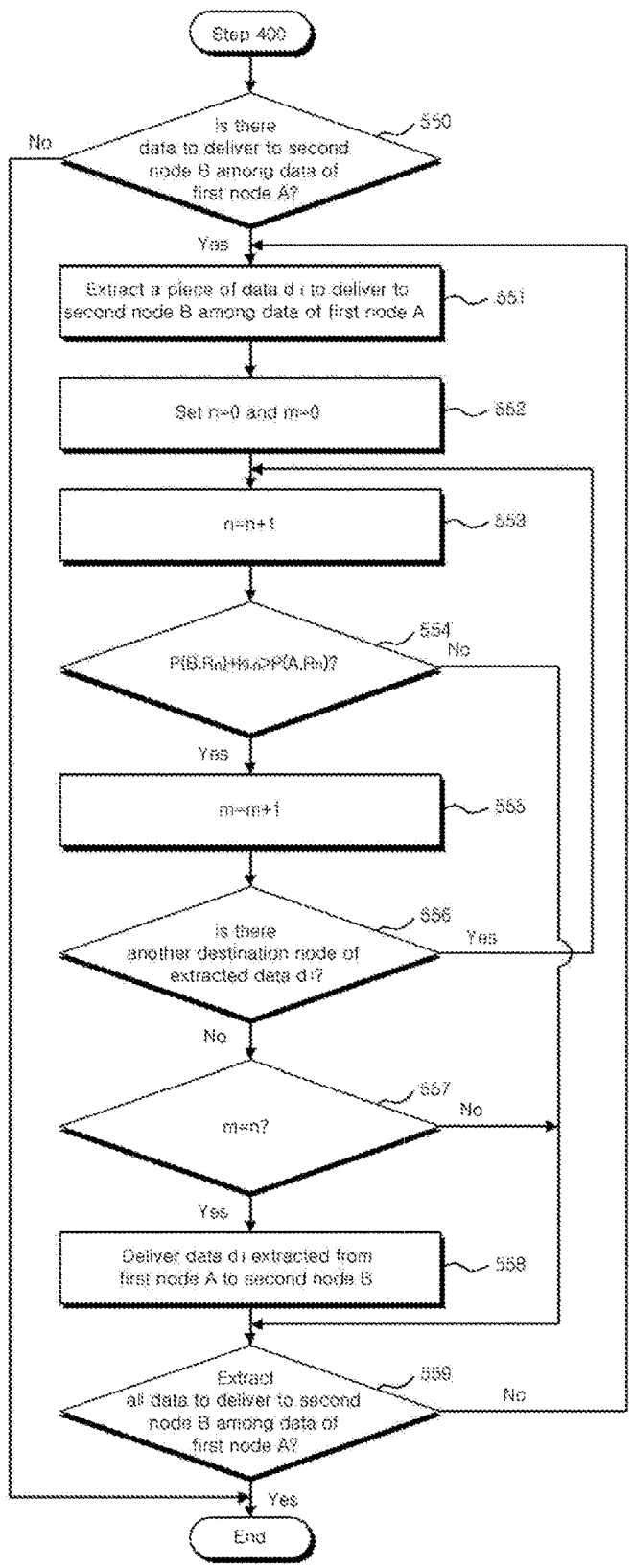

Alternatively, referring to FIG. 15, the data delivery unit 32 may determine if there is data to deliver to the second node B among data that the first node A has (550). The data delivery unit 32 may determine if there is data to deliver to the second node B among data that the first node A has according to the communication scheme in the conventional ICN.

When it is determined that there is data to deliver to the second node B among data that the first node A has (550), the data delivery unit 32 may extract a piece of data $d_i$ to deliver to the second node B among data that the first node A has (551).

The data delivery unit 32 may set to n=0 and m=0 (552), and update to n=n+1 (553). Here, n is a variable for identifying a plurality of destination nodes, and m is a variable representing the number of cases that satisfy the delivery predictability condition.

The data delivery unit 32 may compare delivery predictability between the first node A and destination node $R_n$ of the extracted data $d_i$, with a value obtained by adding a value $k_{i,n}$ of priority assigned to the extracted data $d_i$ by the corresponding destination node $R_n$ to delivery predictability between the second node B and destination node $R_n$ of the extracted data $d_i$, as in the following Equation 14 (554).

$$P(B, R_n) + k_{i,n} > P(A, R_n) \qquad \text{[Equation 14]}$$

Here, the destination node $R_n$ (n=1, 2, 3, ..., N) of data $d_i$ means a request node that created interest information i to request the data $d_i$, and $k_{i,n}$ is the priority term assigned to data $d_i$ by each destination node $R_n$.

When a value obtained by adding a value $k_{i,n}$ of priority assigned to the extracted data $d_i$ by the corresponding destination node $R_n$ to delivery predictability between the second node B and destination node $R_n$ of the extracted data $d_i$ is larger than delivery predictability between the first node A and destination node $R_n$ of the extracted data $d_i$ (554), the data delivery unit 32 may update to m=m+1 (555).

When there is another destination node of the extracted data $d_i$ (556), the data delivery unit 32 may repeat the above described comparison of delivery predictability all over the other destination nodes of the extracted data $d_i$.

When comparison of delivery predictability for all destination nodes of the extracted data $d_i$ is completed, the data delivery unit 32 may determine if m is the same as n (557).

That is, in all destination nodes of the extracted data $d_i$, only when a value obtained by adding a value of priority assigned to each destination node to delivery predictability between the second node B and each destination node is larger than delivery predictability between the first node A and each destination node (557), the data delivery unit 32 may deliver the data $d_i$ extracted from the first node A to the second node B (558).

The data delivery unit 32 may repeat the above described delivery of data that the first node A has to the second node B until it extracts all data to deliver to the second node B among data that the first node A has (559).

Figure 16:
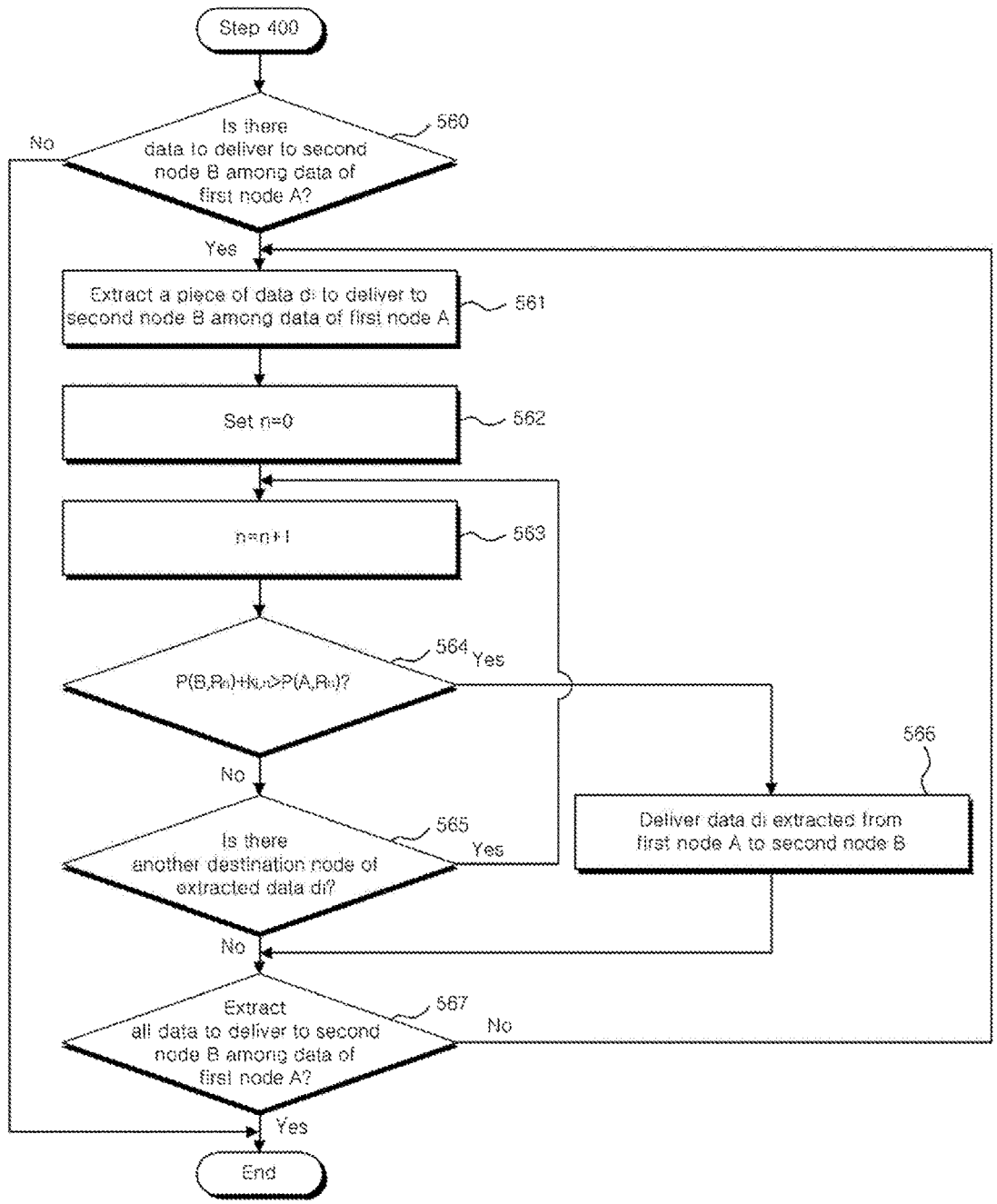

Alternatively, referring to FIG. 16, the data delivery unit 32 may determine if there is data to deliver to the second node B among data that the first node A has (560). The data delivery unit 32 may determine if there is data to deliver to the second node B among data that the first node A has according to the communication scheme in the conventional ICN.

When it is determined that there is data to deliver to the second node B among data that the first node A has (560), the data delivery unit 32 may extract a piece of data $d_i$ to deliver to the second node B among data that the first node A has (561).

The data delivery unit 32 may set to n=0 (562), and update to n=n+1 (563).

The data delivery unit 32 may compare delivery predictability between the first node A and destination node $R_n$ of the extracted data $d_i$, with a value obtained by adding a value $k_{i,n}$ of priority assigned to the extracted data $d_i$ by the corresponding destination node $R_n$ to delivery predictability between the second node B and destination node $R_n$ of the extracted data $d_i$, as in the above Equation 14 (564).

When a value obtained by adding a value $k_{i,n}$ of priority assigned to the extracted data $d_i$ by the corresponding destination node $R_n$ to delivery predictability between the second node B and destination node $R_n$ of the extracted data $d_i$ is larger than delivery predictability between the first node A and destination node $R_n$ of the extracted data $d_i$ (564), the data delivery unit 32 may deliver the data $d_i$ extracted from the first node A to the second node B (566).

On the contrary, when a value obtained by adding a value $k_{i,n}$ of priority assigned to the extracted data $d_i$ by the corresponding destination node $R_n$ to delivery predictability between the second node B and destination node $R_n$ of the extracted data $d_i$ is not larger than delivery predictability between the first node A and destination node $R_n$ of the extracted data $d_i$ (564), the data delivery unit 32 may determine if there is another destination node of the extracted data $d_i$ (565), and perform the above described comparison of delivery predictability on all other destination nodes of the extracted data $d_i$.

That is, when a value obtained by adding a value $k_{i,n}$ of priority assigned to the extracted data $d_i$ by the corresponding destination node to delivery predictability between the second node B and any one of a plurality of destination nodes of the extracted data $d_i$ is larger than delivery predictability between the first node A and the corresponding destination node of the extracted data $d_i$, the data delivery unit 32 may deliver the data $d_i$ extracted from the first node A to the second node B (566). The data delivery unit 32 may repeat the above described delivery of data that the first node A has to the second node B until it extracts all data to deliver to the second node B among data that the first node A has (567).

According to the forwarding method according to an embodiment of the present disclosure as described above, it is possible to achieve effective delivery of interest information and data using delivery predictability of each node that is classified into delivery predictability based on contact information between nodes and delivery predictability based on interest information that the nodes have, compared to the conventional ICN. Additionally, information such as priority is added to the structure of interest information and data defined in the conventional ICN and opportunistic message forwarding reflecting added information is performed, thereby building content-based ICN in a delay tolerant network environment.

Figure 17:
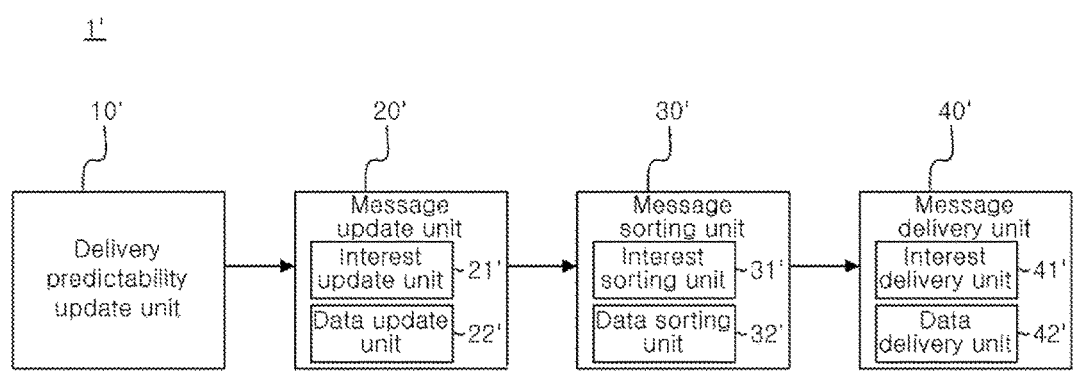
FIG. 17 is a control block diagram of an opportunistic forwarding apparatus for a content-based ICN in a delay tolerant network environment according to another embodiment of the present disclosure.

FIG. 17 is a control block diagram of an opportunistic forwarding apparatus for a content-based ICN in a delay tolerant network environment according to another embodiment of the present disclosure.

Referring to FIG. 17, the forwarding apparatus 1' according to another embodiment of the present disclosure is only different from the forwarding apparatus 1 according to an embodiment of the present disclosure shown in FIG. 1 in that the forwarding apparatus 1' further includes a message sorting unit 30', and the other components are the same. Hereinafter, among the components of the forwarding apparatus 1' according to another embodiment of the present disclosure, only the message sorting unit 30' will be described, and a description of the other components, a delivery predictability update unit 10', a message update unit 20' and a message delivery unit 40' will be replaced with the foregoing.

Upon contact between nodes, the message sorting unit 30' may include an interest information sorting unit 31' which in the case of a plurality of interest information to deliver to other node, sorts the plurality of interest information according to a predefine criterion, and a data sorting unit 32' which in the case of a plurality of pieces of data to deliver to other node, sorts the plurality of pieces of data according to a predefine criterion. The message delivery unit 40' may deliver the plurality of interest information or the plurality of pieces of data to other node in an order of sorting by the message sorting unit 30'.

Specifically, when a first node contacts a second node, in the case of a plurality of interest information to deliver from the first node to the second node, the interest information sorting unit 31' may sort the plurality of interest information in descending order of delivery predictability between the second node and the node that has data corresponding to interest information to deliver to the second node.

Alternatively, the interest information sorting unit 31' may sort the plurality of interest information in descending order of the value of priority assigned to interest information to deliver to the second node.

Alternatively, the interest information sorting unit 31' may sort the plurality of interest information in descending order of the sum of delivery predictability between the second node and node that has data corresponding to interest information to deliver to the second node and a value of priority assigned to interest information.

Alternatively, the interest information sorting unit 31' may sort the plurality of interest information in ascending order of the elapsed time since creation of interest information.

Alternatively, the interest information sorting unit 31' may sort the plurality of interest information in ascending order of the elapsed time since delivery of interest information.

Alternatively, the interest information sorting unit 31' may sort the plurality of interest information in ascending order of the number of hops H of interest information.

Additionally, when a first node contacts a second node, in the case of a plurality of pieces of data to deliver from the first node to the second node, the data sorting unit 32' may sort the plurality of pieces of data in descending order of delivery predictability between the second node and destination node of data to deliver to the second node.

Alternatively, the data sorting unit 32' may sort the plurality of pieces of data in descending order of the sum of delivery predictabilities between the second node and all destination nodes of data to deliver to the second node.

Alternatively, the data sorting unit 32' may sort the plurality of pieces of data in descending order of the sum of delivery predictability between the second node and destination node of data to deliver to the second node and a value of priority assigned to data.

Alternatively, the data sorting unit 32' may sort the plurality of pieces of data in descending order of the value obtained by adding the sum of priorities assigned to data by each destination node to the sum of delivery predictabilities between the second node and all destination nodes of data to deliver to the second node.

The opportunistic forwarding method for a content-based ICN in a delay tolerant network environment as described above may be implemented as an application or in the form of program commands that are executed through various computer components and may be recorded in computer-readable recording media. The computer-readable recording media may include program commands, data files and data structures, alone or in combination.

The program commands recorded in the computer-readable recording media may be specially designed and configured for the present disclosure, and may be those known and available to those having ordinary skill in the field of computer software.

Examples of the computer-readable recording media include hardware devices specially designed to store and execute program commands, for example, magnetic media such as hard disk, floppy disk and magnetic tape, optical recording media such as CD-ROM and DVD, magneto-optical media such as floptical disk, and ROM, RAM, and flash memory.

Examples of the program command include machine code generated by a compiler as well as high-level language code that can be executed by a computer using an interpreter. The hardware device may be configured to act as one or more software modules to perform the operation according to the present disclosure, or vice versa.

While the present disclosure has been hereinabove described with reference to the embodiments, those having ordinary skill in the corresponding technical field will understand that various modifications and changes may be made to the present disclosure without departing from the spirit and scope of the present disclosure set forth in the appended claims.

DETAILED DESCRIPTION OF MAIN ELEMENTS

1: Forwarding apparatus
10: Delivery predictability update unit
20: Message update unit
30: Message delivery unit

What is claimed is:

1. An opportunistic forwarding method for a content-based information centric network in a delay tolerant network environment having a processor and a memory, the opportunistic forwarding comprising:
    when a first node contacts a second node, updating a first delivery predictability and a second delivery predictability of the first node based on contact record information between the first node and the second node and data that the second node has;
    updating a first message of the first node by comparing the first message including first interest information and first data that the first node has with a second message including second interest information and second data that the second node has; and
    delivering the first message of the first node to the second node based on the first and second delivery predictabilities of the first node,
    wherein the step of the delivering the first message of the first node to the second node comprises:
        delivering the first data that the first node has to the second node based on a result of a comparison between the first delivery predictability and the second delivery predictability, wherein the first delivery predictability is a delivery predictability between the first node and at least one destination node of the first data that the first node has and the second delivery predictability is a delivery predictability between the second node and the at least one destination node of the first data that the first node has,
        wherein the step of the delivering the first data that the first node has to the second node based on a result of the comparison comprises:
            delivering the first data that the first node has to the second node based on the result of the comparison of average of delivery predictabilities among the first node and each of the at least one destination node of the first data that the first node has with average of delivery predictabilities among the second node and each of the at least one destination node of the first data that the first node has.

2. The opportunistic forwarding method for the content-based information centric network in the delay tolerant network environment of claim 1, wherein the updating of the first and second delivery predictabilities of the first node comprises:
    updating the first delivery predictability between arbitrary nodes including the first node and the second node based on the contact record information between the first node and the second node, and when is the second data that the second node has include data corresponding to the first interest information that the first node has, updating the second delivery predictability between the first node and any node that has data corresponding to the first interest information that the first node has.

3. The opportunistic forwarding method for the content-based information centric network in the delay tolerant network environment of claim 1, wherein the step of the updating of a first message of the first node comprises:
    when the first interest information include corresponding interest information to any of the second interest information, updating request node information of the corresponding interest information, and when the first data include corresponding data to any of the second data, updating destination node information of the corresponding data.

4. The opportunistic forwarding method for the content-based information centric network in the delay tolerant network environment of claim 1, wherein the step of the delivering of the first message of the first node to the second node comprises:
    delivering the first interest information that the first node has to the second node based on a result of a comparison between the first delivery predictability and the second delivery predictability, wherein the first delivery predictability is a delivery predictability between the first node and node that has data corresponding to the first interest information that the first node has and the second delivery predictability is a delivery predictability between the second node and node that has data corresponding to the first interest information that the first node has.

5. The opportunistic forwarding method for the content-based information centric network in the delay tolerant network environment of claim 4, further comprising:
    reflecting a value of priority assigned to the first interest information that the first node has to the second delivery predictability between the second node and node that has data corresponding to the first interest information that the first node has.

6. The opportunistic forwarding method for the content-based information centric network in the delay tolerant network environment of claim 4, wherein the step of the delivering the first interest information that the first node has to the second node based on a result of a comparison between the first delivery predictability and the second delivery predictability further comprises:
    determining whether a request node of the first interest information that the first node has is the first node based on the result of the comparison; and
    when the request node of the first interest information that the first node has is determined to be the first node, delivering the first interest information that the first node has to the second node based on a retransmission time set when the first interest information that the first node has are generated.

7. The opportunistic forwarding method for the content-based information centric network in the delay tolerant network environment of claim 1, wherein the step of the delivering the first data that the first node has to the second node based on a result of the comparison comprises:

when the result of the comparison of a delivery predictability of any one of the at least one destination node of the first data that the first node has satisfies a predefined condition, delivering the first data that the first node has to the second node, or when the result of the comparison of a delivery predictability of all of the at least one destination node of the first data that the first node has satisfies a predefined condition, delivering first data that the first node has to the second node.

8. The opportunistic forwarding method for the content-based information centric network in the delay tolerant network environment of claim 7, further comprises:

reflecting a value of priority for the first data assigned by the at least one destination node of the first and the second nodes to each of the first delivery predictability between the first node and the at least one destination node of the first data that the first node has and the second delivery predictability between the second node and the at least one destination node of the first data.

9. An opportunistic forwarding apparatus for a content-based information centric network in a delay tolerant network environment, the opportunistic forwarding apparatus comprising:

a processor and a memory;

a delivery predictability update processor configured to, when a first node contacts a second node, update a first delivery predictability between arbitrary nodes including the first node and the second node and a second delivery predictability between the first node and node that has data corresponding to the first interest information that the first node has based on contact record information between the first node and the second node;

a message update processor configured to update a first message of the first node by comparing the first message including first interest information and first data that the first node has with a second message including second interest information and second data that the second node has; and a message delivery processor configured to deliver the first interest information that the first node has to the second node based on a delivery predictability between the first node and node that has data corresponding to the first interest information that the first node has, and to deliver first data that the first node has to the second node based on a delivery predictability between arbitrary nodes including the first node and the second node;

wherein the message delivery processor delivers the first data that the first node has to the second node based on a result of a comparison between the first delivery predictability and the second delivery predictability, wherein the first delivery predictability is a delivery predictability between the first node and at least one destination node of the first data that the first node has and the second delivery predictability is a delivery predictability between the second node and the at least one destination node of the first data that the first node has, wherein the message delivery processor delivers the first data that the first node has to the second node based on the result of the comparison of average of delivery predictabilities among the first node and each of the at least one destination node of the first data that the first node has with average of delivery predictabilities among the second node and each of the at least one destination node of the first data that the first node has.

10. The opportunistic forwarding apparatus for the content-based information centric network in the delay tolerant network environment of claim 9, further comprising:

when a plurality of the interest information or a plurality of pieces of data are delivered to the second node, a message sorting processor configured to sort the plurality of the interest information or the plurality of pieces of data according to a predefined criterion.

11. The opportunistic forwarding apparatus for the content-based information centric network in the delay tolerant network environment according to claim 10, wherein when the plurality of the interest information are delivered to the second node, the message sorting processor is configured to sort the plurality of the interest information based on at least one of a delivery predictability between the second node and node that has data corresponding to the interest information, a value of priority assigned to the interest information, a retransmission time set when the interest information is generated, and number of hops of the interest information, and when the plurality of pieces of data are delivered to the second node, the message sorting processor is configured to sort the plurality of data based on at least one of a delivery predictability between the second node and a destination node of the data and the value of priority assigned to the data.

* * * * *